United States Patent
Ramaswami

(10) Patent No.: US 12,491,810 B2
(45) Date of Patent: Dec. 9, 2025

(54) VEHICLE ACCESS MOBILITY TOOL

(71) Applicant: Meera Ramaswami, Ann Arbor, MI (US)

(72) Inventor: Meera Ramaswami, Ann Arbor, MI (US)

( * ) Notice: Subject to any disclaimer, the term of this patent is extended or adjusted under 35 U.S.C. 154(b) by 182 days.

(21) Appl. No.: 18/302,222

(22) Filed: Apr. 18, 2023

(65) Prior Publication Data

US 2023/0373372 A1    Nov. 23, 2023

Related U.S. Application Data

(60) Provisional application No. 63/344,529, filed on May 20, 2022.

(51) Int. Cl.
*B60N 3/02*    (2006.01)

(52) U.S. Cl.
CPC ............ *B60N 3/026* (2013.01); *B60N 3/02* (2013.01)

(58) Field of Classification Search
CPC ....... B60N 3/023; B60N 3/026; E05B 1/0053; E04F 11/1808; E04F 11/1804; E04F 11/1863
USPC .......................................................... 296/1.02
See application file for complete search history.

(56) References Cited

U.S. PATENT DOCUMENTS

| | | | | |
|---|---|---|---|---|
| 6,340,189 B1* | 1/2002 | Pordy | ............... | B60N 3/026 16/110.1 |
| 6,799,353 B1* | 10/2004 | Stewart | ............... | B60N 3/023 16/110.1 |
| 7,347,467 B2* | 3/2008 | Theobald | ............ | B62D 53/0857 294/24 |
| 8,851,094 B2* | 10/2014 | Kuma | ............... | A45B 9/04 135/77 |
| 8,925,155 B2* | 1/2015 | Grudzien | ............ | E04F 11/1863 16/110.1 |
| 9,403,466 B1* | 8/2016 | Deng | ............... | F21L 4/00 |
| 9,700,109 B2* | 7/2017 | Gordin | ............... | A45B 1/04 |
| 10,155,479 B2* | 12/2018 | Lewis | ............... | B60R 3/007 |
| 10,729,213 B2* | 8/2020 | FitzPatrick | ............... | A45B 9/00 |
| D930,969 S * | 9/2021 | FitzPatrick | ............... | D3/7 |
| 11,338,736 B2* | 5/2022 | Wang | ............... | B60R 3/007 |
| 11,377,040 B2* | 7/2022 | Salter | ............... | E05B 85/04 |
| 11,833,263 B2* | 12/2023 | Gardiner | ............... | A61L 2/10 |
| 2005/0133078 A1* | 6/2005 | Fujitsubo | ............... | B60N 3/026 135/72 |

(Continued)

OTHER PUBLICATIONS

De Long, Lindsey; "How to Use a Car Cane or Car Door Assist Handle," EquipMeOT.com, retrieved Jun. 6, 2024, from https://www.equipment.com/car-door-assist-handle/; archived Jan. 23, 2021, at https://web.archive.org/web/20210123110733/https://www.equipment.com/car-door-assist-handle/; 24 pages.

(Continued)

*Primary Examiner* — Jason S Morrow
(74) *Attorney, Agent, or Firm* — COOLEY LLP

(57) ABSTRACT

A vehicle access device for helping a person to enter and exit a vehicle is provided. The vehicle access device includes an engagement portion configured to engage a striker in a doorframe of a vehicle and to hold the device in a fixed relationship relative to the striker. The device further includes an articulating leg coupled to the engagement portion, the articulating leg including a first member pivotably connected to a second member.

31 Claims, 24 Drawing Sheets

(56) References Cited

U.S. PATENT DOCUMENTS

| | | | | |
|---|---|---|---|---|
| 2014/0373887 A1* | 12/2014 | Gray | ............... | A45B 9/04 |
| | | | | 135/77 |
| 2019/0350323 A1* | 11/2019 | Ritter | ............... | A45B 9/02 |
| 2022/0095753 A1* | 3/2022 | Mehl | ............... | A45B 7/005 |
| 2024/0141651 A1* | 5/2024 | Tuckey | ............... | E04F 11/1804 |

OTHER PUBLICATIONS

Stander Inc.; product information page for Handybar; retrieved Jun. 6, 2024, from https://stander.com/product/handybar-auto-grab-bar/; archived Aug. 3, 2020, at https://web.archive.org/web/20200803150946/https://stander.com/product/handybar-auto-grab-bar/; 11 pages.

* cited by examiner

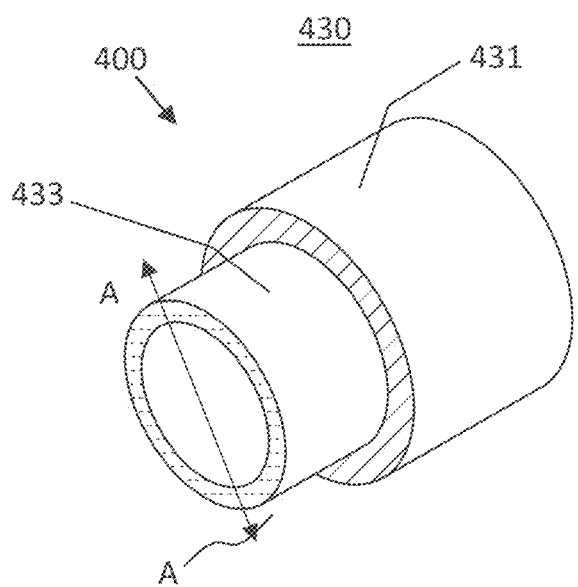
FIG. 4A
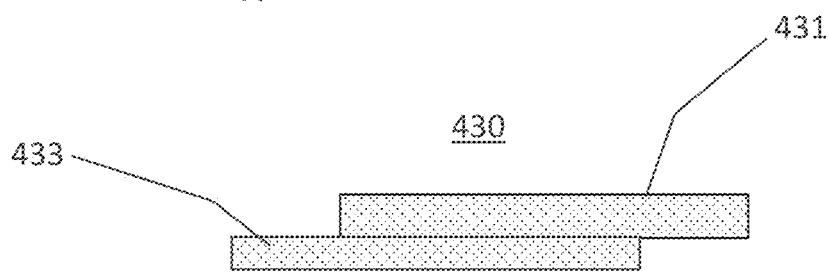
FIG. 4B
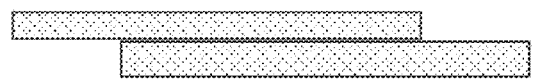
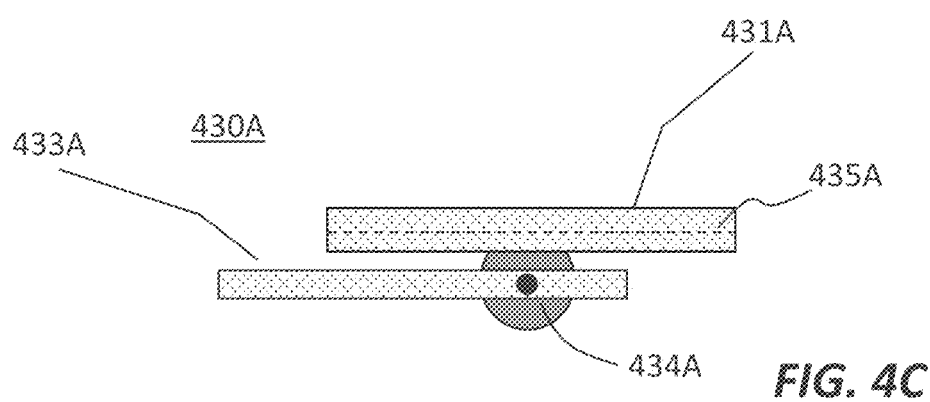
FIG. 4C
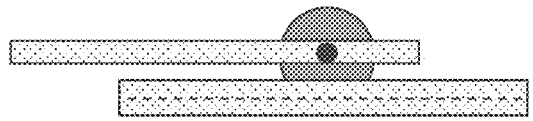

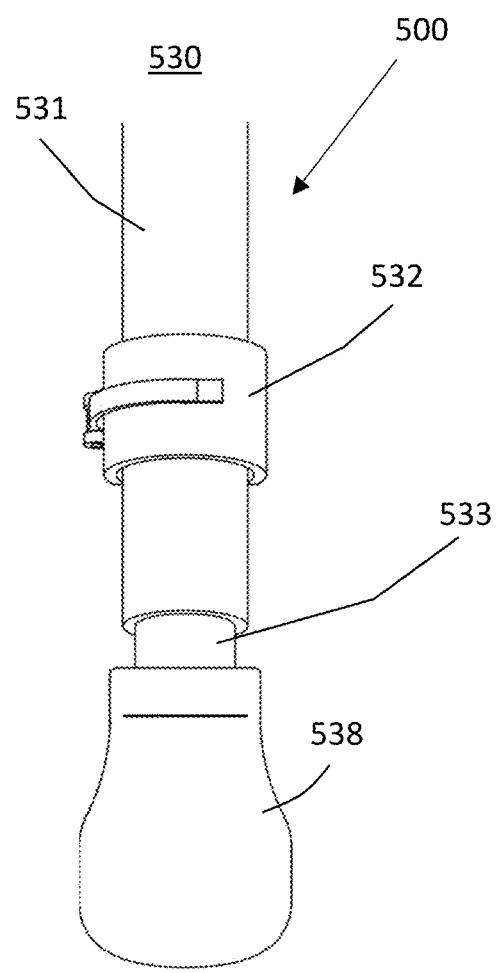
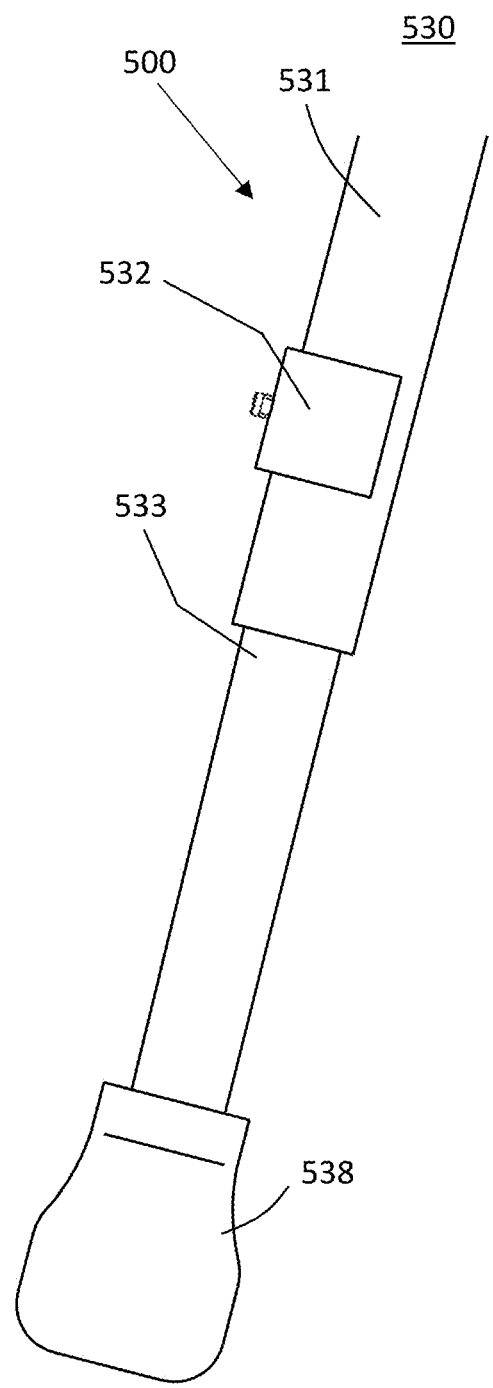
FIG. 5A          FIG. 5B

1600

| 1610 | Engaging an engagement portion of a vehicle access device to a striker located in a doorframe of a vehicle by placing a top surface of the engagement portion under and adjacent to a back portion of the striker element and placing a bottom surface of the engagement portion over and adjacent to the front portion of the striker element |

| 1620 | Unfolding an articulating leg coupled to the engagement portion by forming a selected angle between a first member and a second member of the articulating leg such that the selected angle is larger than ninety degrees, the first member being pivotably connected to the second member |

| 1630 | Locking the first member in a fixed position relative to the second member |

| 1631 | Extending the first elongated portion relative to the second elongated portion by a selected distance |

| 1632 | Locking the first elongated portion into place with respect to the second elongated portion |

| 1640 | Placing a base coupled to a distal end of the second member onto a ground surface |

| 1710 | Disengaging an engagement portion of the device from a striker located in a doorframe of a vehicle |

| 1720 | Unlocking a first member of an articulating leg from being in a fixed position relative to a second member of the articulating leg |

| 1730 | Folding the articulating leg by pivoting the first member relative to the second member such that the first member is substantially parallel to the second member |

*FIG. 17*

VEHICLE ACCESS MOBILITY TOOL

RELATED APPLICATIONS

This application incorporates U.S. Provisional Patent Application No. 63/344,529, filed on May 20, 2022, the disclosure of which is hereby incorporated by reference in its entirety.

TECHNICAL FIELD

The present disclosure generally relates to mobility assisting devices and, more particularly, to systems, devices, and methods for assisting movements of an individual getting in and out of a compartment of a vehicle.

BACKGROUND

Various mobility aids, such as canes and walkers, wheelchairs, or person lifts, provide a walking support and can assist people in getting in and out of bed, transitioning to or from a sitting position, and accessing vehicles. Such tools can greatly benefit older people or people with arthritis, leg or foot injuries, balance problems, strokes, and degenerative diseases such as multiple sclerosis by providing adequate balance and support. Some of these mobility aids may be expensive, space inefficient, or difficult to set up. Among mobility assisting devices, canes may be relatively inexpensive and require less space than some other, more complex mobility assisting devices.

While standard canes can provide some walking support, these canes do not provide sufficient support to a user when getting into and out of a vehicle or other types of compartments. Thus, there is a need for mobility assisting devices that can help with such a task.

SUMMARY

A vehicle access device for assisting a person in entering and exiting a vehicle is provided. Consistent with a disclosed embodiment, the device includes an engagement portion configured to engage a striker in a doorframe of a vehicle and to hold the device in a fixed relationship relative to the striker. The device further includes an articulating leg coupled to the engagement portion, the articulating leg including a first member pivotably connected to a second member.

Consistent with another disclosed embodiment, a kit for assembling a vehicle access device is provided. The kit includes an engagement portion configured to engage a striker in a doorframe of a vehicle and to hold the device in a fixed relationship relative to the striker, a first member of an articulating leg having a first end and a second end, the first end configured to be coupled to the engagement portion, a second member of the articulating leg having a first end and a second end, a central joint configured to pivotably connect the first member and the second member by coupling to a second end of the first member and to the first end of the second member, and a base configured to couple to the second end of the second member.

Consistent with another disclosed embodiment, a method for engaging a vehicle access device with a vehicle is provided. The method includes engaging an engagement portion of a vehicle access device to a striker located in a doorframe of a vehicle by placing a top surface of the engagement portion under and adjacent to a back portion of the striker element, and by placing a bottom surface of the engagement portion over and adjacent to the front portion of the striker element. Further the method includes unfolding an articulating leg coupled to the engagement portion by forming a selected angle between a first member and a second member of the articulating leg such that the selected angle is larger than 90 degrees, the first member being pivotably connected to the second member and locking the first member in a fixed position relative to the second member.

Consistent with another disclosed embodiment, a method for disengaging a vehicle access device is provided. The method includes disengaging an engagement portion of the vehicle access device from a striker in a doorframe of a vehicle, the engagement portion when engaged with the striker configured to hold the vehicle access device in a fixed relationship relative to the striker and unlocking a first member of an articulating leg from being in a fixed position relative to a second member of the articulating leg, the first member being pivotably connected to the second member. The method further includes folding the articulating leg by pivoting the first member relative to the second member such that the first member is substantially parallel to the second member.

The foregoing general description and the following detailed description are exemplary and explanatory only and are not restrictive of the claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A-4C are views of a first elongated portion and a second elongated portion of a member of a vehicle access device, according to an embodiment.

FIG. 5A is a view of a member and a base of a vehicle access device when the member is not extended, according to an embodiment.

FIG. 5B is a view of a member and a base of a vehicle access device when the member is extended, according to an embodiment.

FIG. 16 is an example method of placing a vehicle access device in a deployed configuration, according to an embodiment.

FIG. 17 is an example method of placing a vehicle access device in a folded configuration, according to an embodiment.

DETAILED DESCRIPTION

Figure 1A:
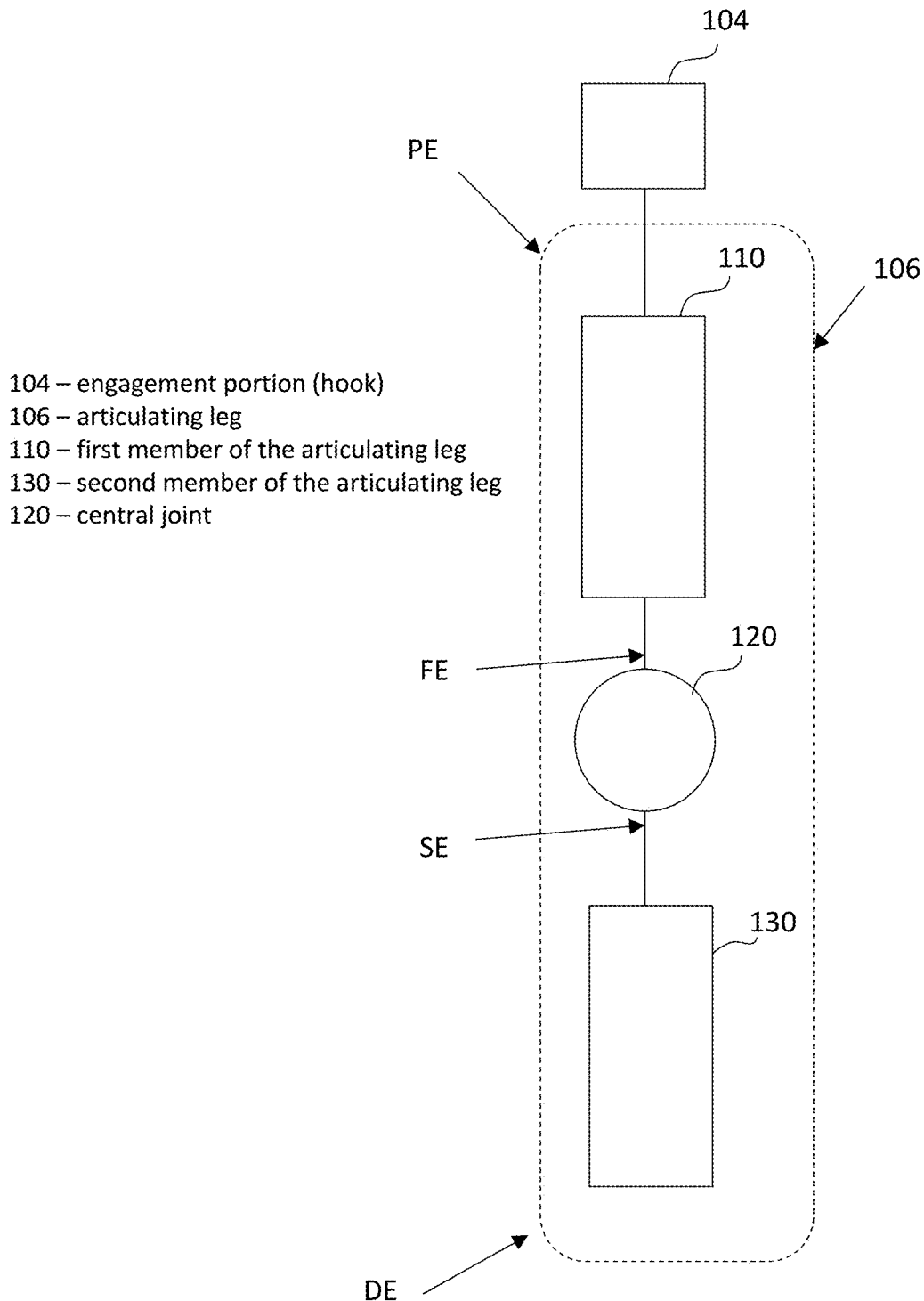
FIG. 1A is an example diagram of a vehicle access device, according to an embodiment.

Aspects of the present disclosure are related to a device for assisting a user with vehicle access. In various embodiments discussed herein, the device is configured to assist a user in getting into and out of the vehicle. FIG. 1 shows an example schematic of a device 100 for assisting a user with getting into and out of a vehicle, according to embodiments. The device 100 includes an engagement portion 104 and an articulating leg 106 coupled to the engagement portion 104. For instance, a proximal end PE of the articulating leg 106 is coupled to of the engagement portion 104, as shown in FIG. 1A. The engagement portion 104 may be welded to the proximal end PE of the articulating leg 106, or fixedly coupled to the proximal end PE using any other suitable means, such as screws, bolts, rivets, glue, and the like. Alternatively, in some cases, the engagement portion 104 may be configured to decouple from the proximal end PE of the articulating leg 106. For example, the engagement portion 104 may be decoupled (e.g., unscrewed, unbolted, etc.) from the articulating leg 106 and replaced. This can be useful for replacing selective components of the device 100, e.g., if the engagement portion 104 is damaged, or a different engagement portion needs to be selected to match a particular configuration of a car (or other compartment) that is user getting in and out of.

Figure 1B:
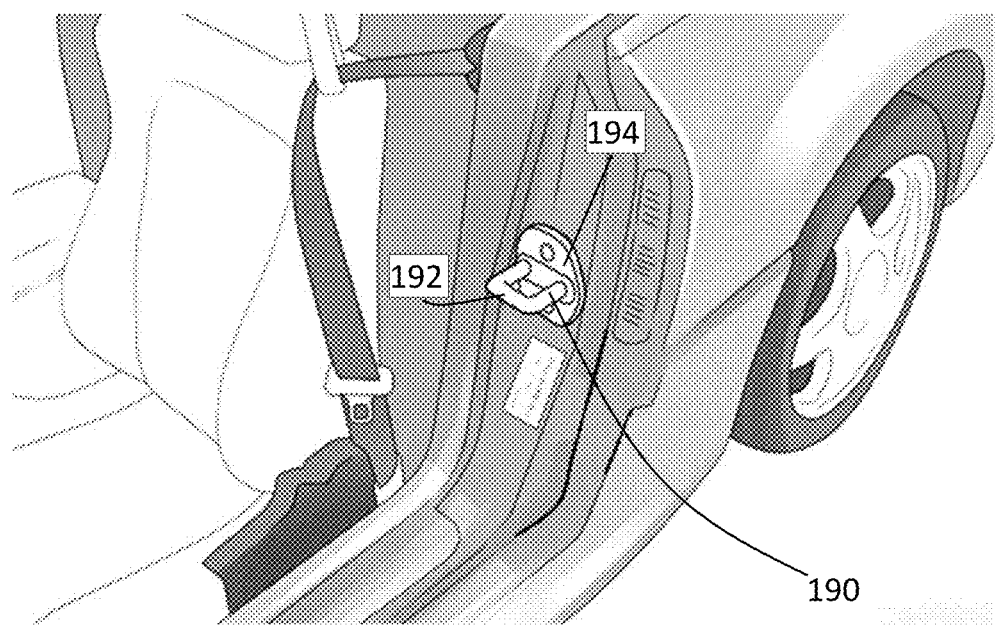
FIG. 1B is an example striker fixedly mounted to an interior of a vehicle door frame, according to an embodiment.

The engagement portion 104 is configured to engage a striker, located in a doorframe of a vehicle, and to hold the device 100 in a fixed relationship relative to the striker. The striker of a vehicle (herein, also referred to as a door striker or simply a striker) is a U-shaped clip that serves as the anchor for the door latch. The door striker is typically installed in a door frame (e.g., a door jamb) and is aligned with a door latch so that the latch catches onto the striker when the door of the vehicle closes. An example view of the striker 190 located in the door frame of a vehicle is shown in FIG. 1B. The striker 190 is fixedly mounted to an interior of a vehicle door frame and includes a U-shaped member 192 fixedly mounted or integrally mounted to a based plate 194. Importantly, because the striker 190 of the vehicle is designed to keep a door of the vehicle closed, even in high impact situations (e.g., including those associated with accidents), the striker 190 of a vehicle is designed to bear high forces and loads. As such, the striker 190 is well suited for use with the mobility access devices such as device 100 described herein.

The articulating leg 106 of the device 100 is an extended portion of the device 100 for supporting a weight of a user when user exits or enters the vehicle. The articulating leg 106 includes a first member 110 pivotably connected to a second member 130 at a central joint 120. The first member 110 includes the proximal end PE at which it is coupled to the engagement portion 104. The distal end of the first member 110 is connected to a first end FE of the central joint 120, and the proximal end of the second member 130 is connected to a second end SE of the central joint 120, as shown in FIG. 1A.

In various implementations, the first member 110 and the second member 130 may be elongated members formed from a durable material and having a structure such that the articulating leg 106 is capable of supporting at least a partial weight of a person when a person leans on the articulating leg 106 at various possible leaning angles. Further, in various implementations, the articulating leg 106 is configured to support the partial weight of a user when the engagement portion 104 is engaged to the striker of a vehicle. In some cases, the articulating leg 106 may support at least a 75% weight, 60% weight, 45% weight, 30% weight or 15% weight of the user. In some cases, the articulating leg 106 is configured to support 300 pounds (lb), 280 lb, 260 lb, 240 lb, 220 lb, 200 lb, 180 lb, 160 lb, 140 (lb), 120 lb, 100 lb, and the like. In some cases, the articulating leg 106 is configured to support more than 300 lb (e.g., 400 lb). In some cases, the articulating leg is configured to support a weight in a range of 400-50 lb, including all the values and ranges in therebetween. In some implementations, the materials for forming the first member 110 and/or the second member 130, may include metal (e.g., aluminum, aluminum alloys, steel, steel alloys, titanium, and the like), wood, plastic, such as PVC, ceramics, fiberglass, carbon fiber, combination thereof, and the like. Further, structures used for forming the first member 110 and/or the second member 130 includes cylindrical structures, I-beam shape structures, combination thereof, and the like. The cylindrical structures may have a circular cross-section, rectangular cross-section, triangular cross-section, hexagonal cross-section, combination thereof, or any other suitable cross-section. In some cases, the structures for forming the first member 110 and/or second member 130 may be hollow, partially hollow (e.g., include suitable internal structure, such as internal meshes), or solid. In some cases, structures of several different cross-sections may be used in combination to form the first member 110 and/or second member 130. Additionally, structures formed from various materials, may be used in any suitable combination to form the first member 110 and/or second member 130.

As described above, the first member 110 and the second member 130 are configured to be connected by a central joint 120. The central joint 120 allows the second member 130 to be pivotally connected to the first member 110, such that the second member 130 can be oriented at an angle to the first member 110. In one implementation, the central joint 120 is configured such that the first member 110 and the second member 130 can form any suitable angle in a range of 0 to 360 degrees about an axis of rotation, including all values and sub-ranges therebetween. In some implementations, a first member 110 and the second member 130 may form an angle in a range of 0 to about 180 degrees about an axis of rotation. When the first member 110 and the second member 130 forms no angle (or substantially no angle), the device 100 can be in a folded configuration. In the folded configuration, the first member 110 is positioned substantially parallel to the second member 130.

Further, when an angle between the first member 110 and the second member 130 is substantially larger than zero (e.g., the angle between the first member 110 and the second member 130 is about 90 degrees, about 100 degrees, about 110 degrees, about 120 degrees, about 130 degrees, about 140 degrees, and the like, including all values and sub-ranges therebetween), the device 100 can be in a deployed configuration.

Figure 1C:
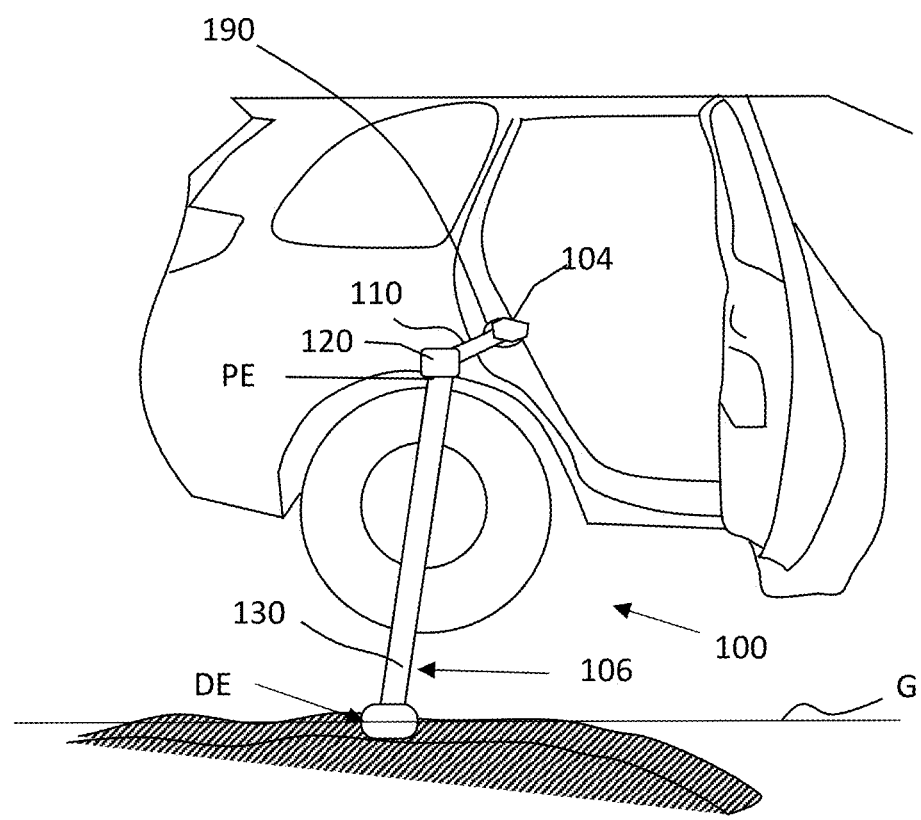
FIG. 1C is an example view of the device shown in FIG. 1A in a deployed configuration for accessing the vehicle, according to an embodiment.

FIG. 1C shows the device 100 when the device 100 is in a deployed configuration. In the deployed configuration of the device 100, the engagement portion 104 can be coupled to the striker 190 located in the door frame of a vehicle, and the first member 110 and second member 130 of the articulating leg 106 form an angle, which can be, for example, an obtuse or right angle. For example, the angle may be in a range of about 90 to 150 degrees, including all the values and ranges in between. As shown in FIG. 1C, a distal end DE of the second member 130 is configured to contact a ground surface G, while the proximal end PE of the second member 130 is coupled to the central joint 120. Further, the first member 110 extends between the striker 190 and the central joint 120. In some implementations, the first member 110 may be positioned substantially parallel to the ground surface G, while the second member 130 may be positioned substantially perpendicular to the ground surface G, and extended between the central joint 120 and a location at the ground surface G. In some cases, the first member 110 may not be substantially parallel to the ground surface G, but instead, form a positive or a negative angle to the ground surface G. The positive angle indicates that the engagement portion 104 coupled to the striker 190 is higher from the ground surface G than the central joint 120, and the negative angle indicates that the engagement portion 104 coupled to the striker 190 is lower from the ground surface G than the central joint 120. In one example use of the device 100, the first member 110 may form about a 5-degree angle to the ground surface G, about a 10-degree angle, about a 15-degree angle, about a 20-degree angle, or any other suitable angle in a range of about 0 to 60 degrees, including all the ranges and values in between. In another example use of the device 100, the first member 110 may form about a negative 5-degree angle to the ground surface G, about a negative 10-degree angle, about a negative 15-degree angle, about a negative 20-degree angle, or any other suitable angle in a range of about 0 to negative 60 degrees, including all the ranges and values in between.

Similarly, in some cases, the second member 130 may not be positioned substantially perpendicular to the ground surface G but instead form a positive or a negative angle to the ground surface G. The positive angle indicates that the central joint 120 is closer to the door frame of the vehicle than the distal end of the articulating leg 106, and the negative angle indicates that the central joint 120 is further away from the door frame of the vehicle than the distal end of the articulating leg 106. In one example use of the device 100, the second member 130 may form about a 5-degree angle to the ground surface G, about a 10-degree angle, about a 15-degree angle, about a 20-degree angle, or any other suitable angle in a range of about 0 to 60 degrees, including all the ranges and values in between. In another example use of the device 100, the second member 130 may form about a negative 5-degree angle to the ground surface G, about a negative 10-degree angle, about a negative 15-degree angle, about a negative 20-degree angle, or any other suitable angle in a range of about 0 to negative 60 degrees, including all the ranges and values in between.

In various implementations, when the device 100 is in a deployed configuration the first and second members lie in the same plane that is perpendicular to the ground surface G. Further, the first and the second members are configured to pivot within that plane.

The central joint 120 is configured to include a locking mechanism for locking a position of (i.e., securing in a fixed matter) the first member 110 relative to the second member 130 at a selectable fixed angle (herein, such angle is referred to as a central joint angle). Further, the locking mechanism can be unlocked to unlock the central joint angle.

In an example implementation, the central joint angle locking may result in any suitable central joint angle. For example, the central joint angle may be about 0 degrees (e.g., when the first member 110 and the second member 130 are parallel to each other), about 80 degrees, about 90 degrees, about 100 degrees, about 110 degrees, about 120 degrees, about 130 degrees, about 140 degrees, about 150 degrees, about 160 degrees, about 170 degrees, or about 180 degrees. In some cases, the central joint angle may be in a range of 0 to about 180 degrees, including all the values and ranges in between. Further details of a locking mechanism for locking the central joint angle are discussed below in relation to FIG. 8.

Figure 2A:
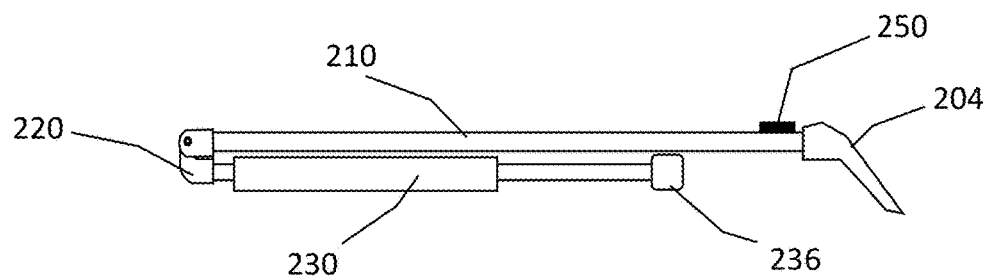
FIGS. 2A and 2B are views of a vehicle access device in a folded and deployed configuration, respectively, according to an embodiment.
Figure 2B:
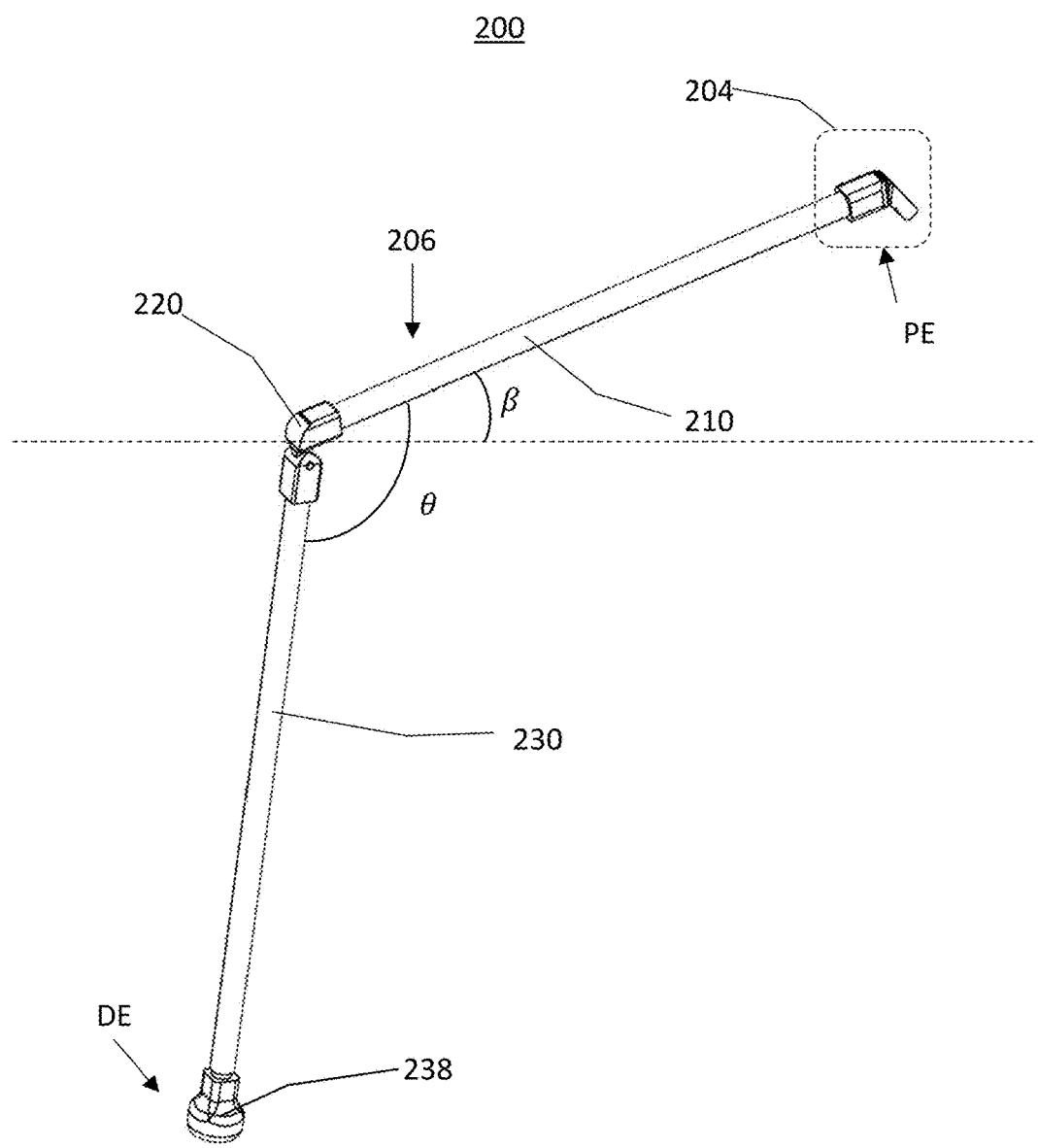

FIG. 2A shows a device 200 in a folded configuration and FIG. 2B shows the device 200 in a deployed configuration, according to embodiments. The device 200 can be for assisting a user with getting into and out of a vehicle. The device 200 may be the same as or similar to the device 100 as shown in FIG. 1A. For instance, various components of the device 200 may be the same as or similar to the respective components of the device 100. For example, the device 200 includes an engagement portion 204 located at a proximal end PE of the device 200, and an articulating leg 206. The articulating leg 206 includes a first member 210, a second member 230, and a central joint 220 configured to pivotably couple the first member 210 and the second member 230. As shown in FIG. 2B, the first member 210 and the second member 230 are coupled via the central joint 220 such that there is a central joint angle $\theta$ formed between the first member 210 and the second member 230. As shown in FIG. 2A, in the folded configuration, the first member 210 is positioned substantially parallel to the second member 230 (e.g., the central joint angle $\theta$ is zero in the folded configuration). Further, as shown in FIG. 2B, in the deployed configuration, in some cases, the central joint angle $\theta$ may be larger than about 90 degrees. In some configurations of the device 200, in the deployed configuration, a central joint angle $\theta$ may be selected such that the first member 210 is placed substantially parallel to a ground surface (e.g., the locking mechanism may be configured to lock the first member 210 relative to the second member 230 when the first member 210 is substantially parallel to the ground surface). In some cases, a user may visually determine that the first member 210 is placed substantially parallel to the ground surface, and in other cases, device 200 may include an indicator to indicate to the user that the first member 210 is substantially parallel to the ground surface (e.g., the indicator may be a level indicator, or any other suitable device for performing a similar function). In some cases, when the indicator is a level indicator, the level indicator may be a part of the first member 210. Alternatively, in some cases, the first member 210 may form an angle with the ground surface (e.g., the angle β, as shown in FIG. 2B, between the first member and the ground surface may be a few degrees or a few tens of degrees. In some cases, the angle β may be about 5 degrees, about 10 degrees, about 15 degrees, about 20 degrees, about 25 degrees, about 30 degrees, and the like. In some cases, the angle β may range between 0-40 degrees including all the values and ranges in between.

In some embodiments, the device 200 may include a deployment mechanism 250, as shown in FIG. 2A, configured to transition the device from the folded configuration to the deployed configuration. For instance, the deployment mechanism 250 is configured to facilitate pivoting the second member 230 relative to the first member 210. In one example embodiment, the deployment mechanism 250 may include a spring-based mechanism configured to rotate the second member 230 relative to the first member 210 when the device is in a folded configuration, and a button configured to activate the spring-based mechanism to transition the device from the folded configuration to a deployed configuration upon user pressing the button. In some embodiments, the deployment mechanism 250 can include electrical components, e.g., a motor, along with mechanical components that rotate and/or translate the first member 210 relative to the second member 230. It should be noted that in some cases, the deployment mechanism 250 may not be present and a user may deploy the device 200 by manually pivoting the second member 230 relative to the first member 210 until the activation of the locking mechanism for the central joint.

Additionally, the device 200 includes a base 238 configured to contact the ground surface G, when a distal end DE of the device 200 is placed onto the ground surface G. The base 238 may be formed from a material that provides adequate traction (e.g., a traction that prevents a slippage of the device 200 with respect to the ground surface G when a user places at least some of his/her weight onto the device 200). For instance, the base 238 may be formed from anti-slip rubber, plastic, or any other material that can engage with the ground surface G and provide a gripped or high friction engagement.

Figure 3:
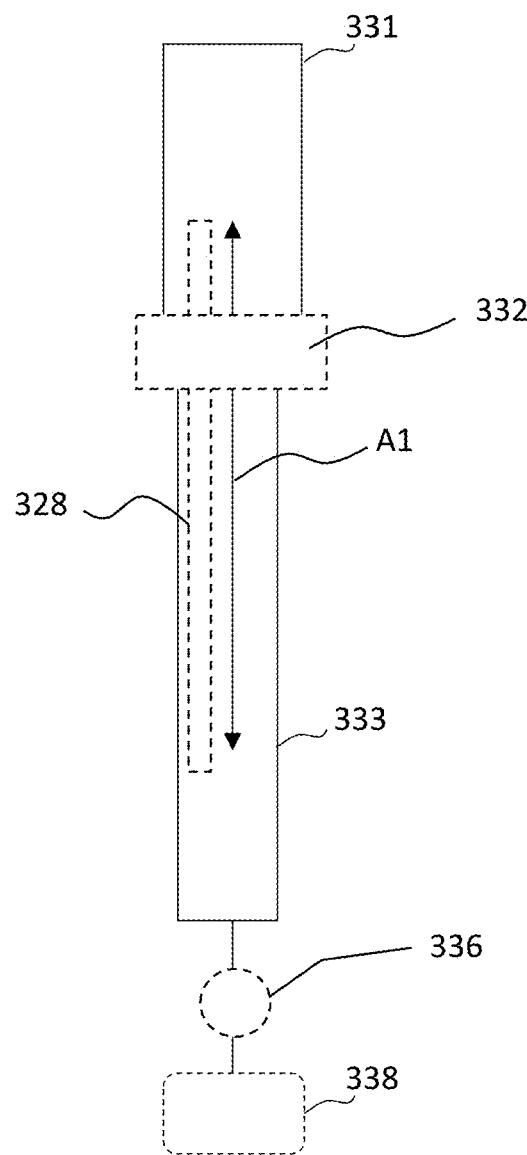
FIG. 3 is an example diagram of a member of a vehicle access device, according to an embodiment.

FIG. 3 shows an example embodiment of a second member 330 of a device 300 for providing mobility assistance, e.g., in getting in and out of a vehicle, according to embodiments. The device 300 can include a first elongated portion 331 and a second elongated portion 333, a base 338, and optionally a base joint 336, a second member locking mechanism 332, and an extending mechanism 328. In the example embodiment shown in FIG. 3, the second elongated portion 333 may be configured to move relative to the first elongated portion 331, as schematically indicated by arrow A1 in FIG. 3. In the example embodiment, the first elongated portion 331 is slidably connected to the second elongated portion 333. In some implementations, the second elongated portion 333 may be disposed at least partially within the first elongated portion 331 (e.g., within a channel defined by the first elongated portion 331), and in other implementations, the first elongated portion 331 may be disposed at least partially within the second elongated portion 333 (e.g., within a channel defined by the second elongated portion 333).

FIGS. 4A-4B depict different views of an example embodiment of a second member 430 of a device 400 for providing mobility assistance, e.g., in getting in and out of a vehicle. The second member 430 may be structurally and/or functionally similar to other second members described herein, including, for example, second member 330. The second member 430 includes a first elongated portion 421 in a form of a cylinder with a circular cross-section (e.g., a pipe), and a second elongated portion 433 in a form of another cylinder with a circular cross-section (e.g., a pipe) that has a smaller diameter such that the second elongated portion 433 fits within the first elongated portion 431. FIG. 4B shows a cross-sectional view along a plane A-A (the plane A-A is shown in FIG. 4A) of the first elongated portion 431 and a second elongated portion 433. In the example implementation, the first elongated portion 431 is slidably connected to the second elongated portion 433 (e.g., the second elongated portion 433 may slide into the first elongated portion 431 or out of the first elongated portion 431 by a selected distance). In various implementations, the first elongated portion 431 and the second elongated portion 433 may form a telescopically adjustable shaft.

FIG. 4C shows an example variation of a second member 430A, wherein the second elongated portion 433A includes wheels 434A for facilitating sliding of the second elongated portion 433A. The wheels 434A may be configured to slide within grooves schematically shown by dashed line 435A in FIG. 4C. The inclusion of wheels 434A may reduce friction between the second elongated member 433A and the first elongated member 433A. It should be noted that any other suitable approaches may be used for reducing the frictional forces (e.g., ball bearings, cylinder bearings, lubricants, and the like may be used) between an example first elongated portion and a second elongated portion. As described above, while it is shown in FIGS. 4A-4B that the second elongated portion 433 is disposed within the first elongated portion 431, in other implementations a first elongated portion may be disposed within a second elongated portion.

Returning to FIG. 3, the device 300 optionally includes the extending mechanism 328. The extending mechanism 328 can be configured to automatically adjust a distance d by which the second elongated portion 333 is moved relative to the first elongated portion 331 based on a value of a central joint angle (e.g., the central joint angle θ, as shown in FIG. 2B). For instance, if the device 300 is in the folded configuration (e.g., the central joint angle θ is zero), then the second elongated portion 333 may be disposed substantially within the first elongated portion 331 (or the first elongated portion 331 may be disposed substantially within the second elongated portion 333), and when the device 300 is in a deployed configuration (e.g., central angle θ is at a target $θ_{target}$ value which may be, for instance, greater than 90 degrees), the second elongated portion 333 may be moved relative to the first elongated portion 331 by a target distance $d=d_{target}$. In some cases, the extending mechanism 328 may continuously couple the central joint angle θ and the distance d. For example, the extending mechanism 328 may be configured to cause the distance d to be directly proportional to the central joint angle θ, or cause distance d to depend on central joint angle θ in any other suitable way $d(θ)$. For instance, $d(θ)$ may initially increase until θ is about 90 degrees, and then decrease when θ is larger than about 120 degrees. In some cases, the distance d(θ) may have a first value $d_1$, when θ=0, a second value $d_2$ larger than $d_1$ when θ is in a range of about 60 to 120 degrees and have a third value $d_3$ which is smaller than $d_2$ but larger than $d_1$ when θ is about 180 degrees. For instance, the third value $d_3$ may be selected such that the device 300 may be used as a walking cane, when the central joint angle θ is about 180 degrees. In various cases, the respective lengths of the first elongated portion 331 and the second elongated portion 333 may be selected, such that the device 300 may be used as a walking cane when the central joint angle θ is selected to be about 180 degrees (e.g., the combined length of the first member 331 and the second member 333 may result in the device 300 having a length of a walking cane when the central joint angle θ is selected to be about 180 degrees).

The extending mechanism 328 may be any suitable mechanical or electrical mechanism for adjusting the distance d. For example, the extending mechanism 328 may be any suitable mechanism for converting a rotational motion of the first member 310 moving relative to the second member 330 by the central joint angle θ, into a translational motion for moving the second elongated portion 333 relative to the first elongated portion 331. Some example implementations of extending mechanisms 328 include rack and pinion, cam and follower, and the like.

The device 300 optionally includes the second member locking mechanism 332 for locking the second elongated portion 333 relative to the first elongated portion 331. The second member locking mechanism 332 may lock the second elongated portion 333 in place after the second elongated portion 333 is moved relative to the first elongated portion 331 by a selected distance. Alternatively, in some variations, a first elongated portion 331 may be configured to be locked in place relative to the second elongated portion 333 when the first elongated portion 331 is moved relative to the second elongated portion 333 by a selected distance.

An example second member locking mechanism 532 is shown in FIGS. 5A and 5B for a second member 530 of a device 500 for providing mobility assistance, e.g., in getting in and out of a vehicle. The device 500 may be the same as or similar to the device 300 as shown in FIG. 3. For example, the second member of device 500 includes a first portion 531 and a second portion 533 slidably connected to the first portion. Further, the device 500 includes a base 538 which may be similar to a base 338 of the device 300. The second member locking mechanism 532 may be any suitable locking mechanism for locking the second portion 533 relative to the first portion 531. For instance, the second member locking mechanism 531 may be a flip lock, a twist lock, a lever lock, a pin lock, a button lock, or any suitable locking mechanism (e.g., a friction-based lock, and the like).

FIG. 5A shows a configuration of the second member 530, when the second portion 533 is substantially disposed within the first portion 531, while FIG. 5B shows another configuration of the member 530, when the second portion 533 is extended out from the first portion 531. The second member locking mechanism 532 may lock the second elongated portion 533 relative to the first elongated portion 531 so as to lock a distance by which the second member 533 is extended out. In some implementations, e.g., when the second member locking mechanism 532 is a flip lock or a twist lock, the second elongated portion 533 may be locked relative to the first elongated portion 531 when the second elongated portion 533 is moved relative to the first elongated portion 531 by any suitable distance. Alternatively, in some other implementations, the second member locking mechanism 532 may lock the second elongated portion 533 relative to the first elongated portion 531 when the second elongated portion 533 is moved relative to the first elongated portion 531 by a preset distance (or a set of preset distances).

In some configurations, a second elongated portion (e.g., the second elongated portion 333 or 533) is moved relative to a first elongated portion (e.g., the first elongated portion 331 or 551) such that the resulting length of the second member (e.g., the second member 330 or 530) is about the same as a striker height, i.e., the distance from the location of a striker (e.g., the striker 190, as shown in FIG. 1B) and a ground surface (e.g., the ground surface G, as shown in FIG. 1C). In such a configuration, if a central joint angle (e.g., the central joint angle θ, as shown in FIG. 2B) is about 90 degrees, then the first member (e.g., first member 210, as shown in FIG. 2A) is about parallel to the ground surface G. In some other configurations, the resulting length of the second member may be selected to be smaller or larger than the striker height. For example, the length of the second member may be selected to be about 70 percent, 80 percent, 90 percent, 110 percent, 120 percent, or 130 percent of the striker height. In some cases, the resulting length of the second member may be selected to be in a range between about 50-150 percent of the striker height including all the values and ranges in between.

In some cases, the length of the first elongated portion 531 is about equal or greater than the length of the second elongated portion 533, such that the second elongated portion 533 may be fully inserted into the first elongated portion 531. Alternatively, in other implementation, when the first elongated portion 531 is configured to be inserted into the second elongated portion 533, the length of the second elongated portion 533 may be about equal or greater than the length of the first elongated portion 531.

Further, in some implementations, the length of the first elongated portion 531 may be less than a length of a first member (e.g., the first member 210, as shown in FIG. 2B), or vice versa.

Figure 6A:
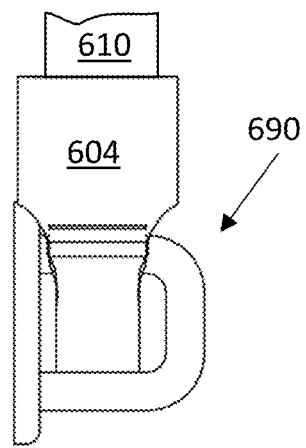
FIGS. 6A-6D are views of an engagement portion of a vehicle access device coupled to a striker, according to an embodiment.
Figure 6B:
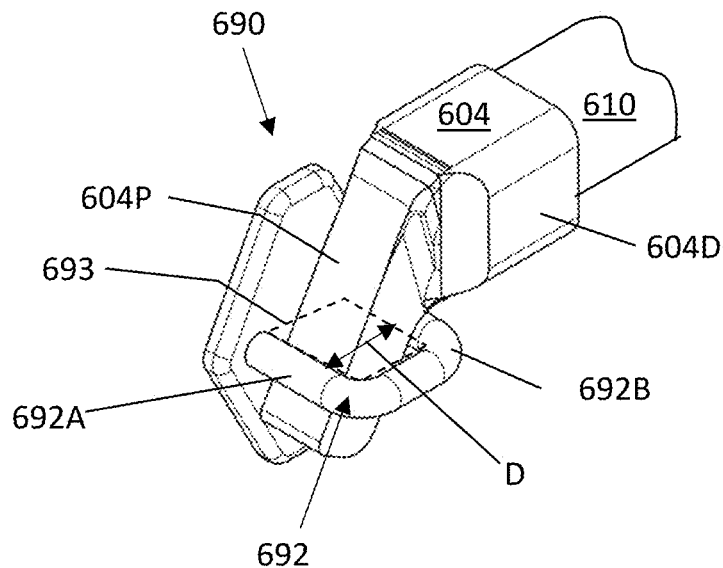
Figure 6C:
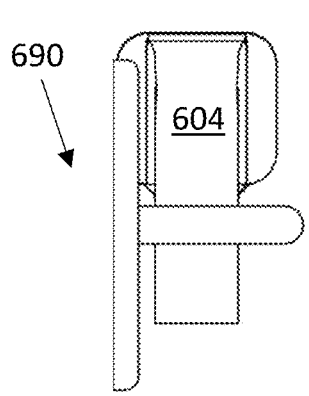
Figure 6D:
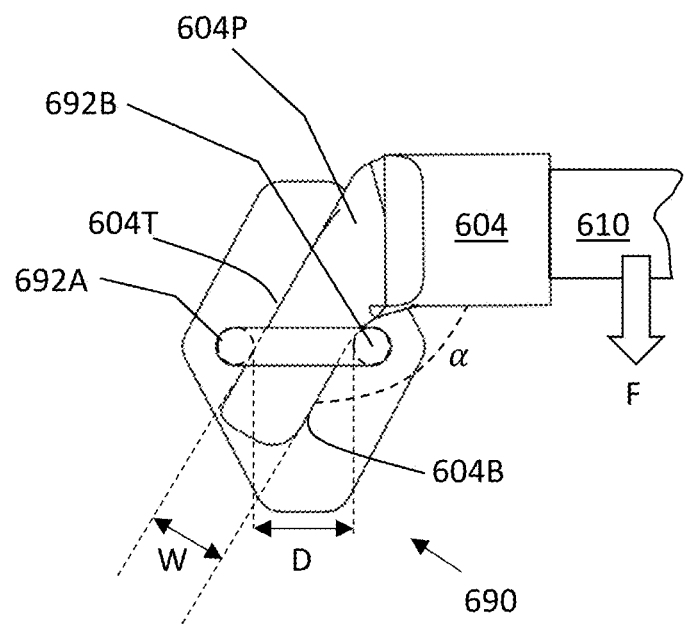

FIGS. 6A-6D depict various views of an example engagement portion 604 inserted into a striker 690, according to embodiments. For example, FIG. 6A shows a top view of, FIG. 6B shows a perspective view of, FIG. 6C shows a front view of, and FIG. 6D shows a side view of the engagement portion 604 inserted into the striker 690. The engagement portion 604 can be structurally and/or functionally similar to other engagement portions described herein (e.g., engagement portion 104, 204, etc.). The engagement portion 604 is a rigid member formed of a durable material such as metal (e.g., aluminum, stainless steel, titanium, Duralumin, and the like), plastic, ceramics, or any other material capable to withstand forces commensurate with a weight of a person. For example, in some implementation the engagement portion 604 may be configured to withstand torques on the order of a weight of a person multiplied by a length of a device for assisting a user with getting into and out of a vehicle (e.g., the engagement portion 604 may be configured to withstand a torque of about a few hundred to a few thousand Newton-meters, e.g., 2000 Newton-meter, including all sub-ranges and values therebetween).

As shown by the perspective view of the engagement portion 604 in FIG. 6B, the engagement portion 604 includes a proximal part 604P for coupling with the striker 690 and a distal part 604D that is connected to or integrated with a first member 610 (e.g., in a monolithic construction). In an example implementation, the proximal part 604 forms an angle α with the distal part 604D, as shown in FIG. 6D. The angle α is selected such that, when the proximal part 604P has a width W, and the striker 690 has a width D between a striker back portion 692A and a striker front portion 692B (note that width D is a width of a striker opening 693, as shown in FIG. 6B), as shown in FIG. 6D, the angle α is selected to be about $\alpha = \operatorname{acos}(W/D) + 90°$. As can be seen from FIGS. 6B and 6D, the width W is smaller than width D, such that the proximal part 604P is configured to be inserted into the striker opening 693 at an angle α.

In various implementations, the proximal part 604 has a length commensurate to extend fully through the U-shaped member 692 of the striker 690 (as shown in FIG. 6B). The proximal part 604P of the engagement portion 604 includes a top surface 604T and a bottom surface 604B, as shown in FIG. 6D (herein, the top surface 604T is also referred to as the top surface of the engagement portion 604, and the bottom surface 604B is also referred to as the bottom surface of the engagement portion 604). The engagement portion 604 is configured to engage with the striker 690, such that the top surface 604T is placed under and adjacent to the striker back portion 692A, and the bottom surface 604B of the engagement portion 604 is placed over and adjacent to the front portion 692A, thereby the engagement portion 604 engages the striker 690. Further the engagement portion 604 can be removed from the striker 690 by retracting the proximal part 604P from the opening 693.

Figure 6E:
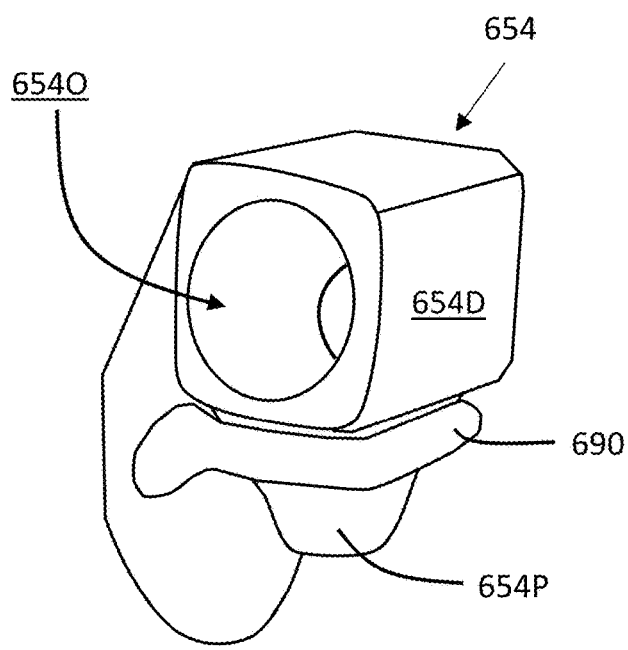
FIGS. 6E-6G are views of another implementation of the engagement portion of a vehicle access device coupled to a striker, according to an embodiment.
Figure 6F:
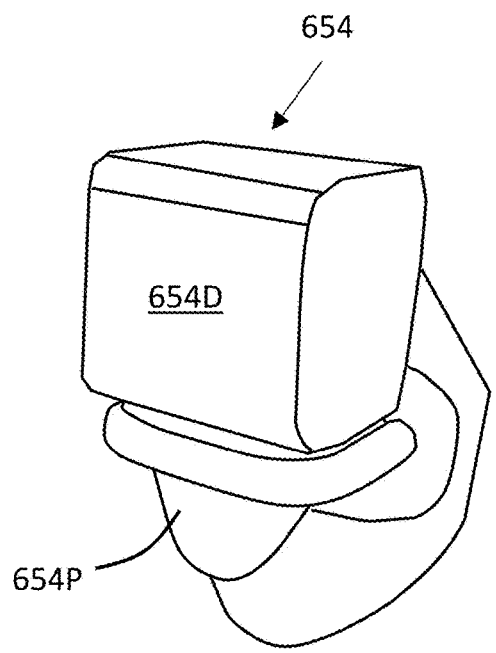
Figure 6G:
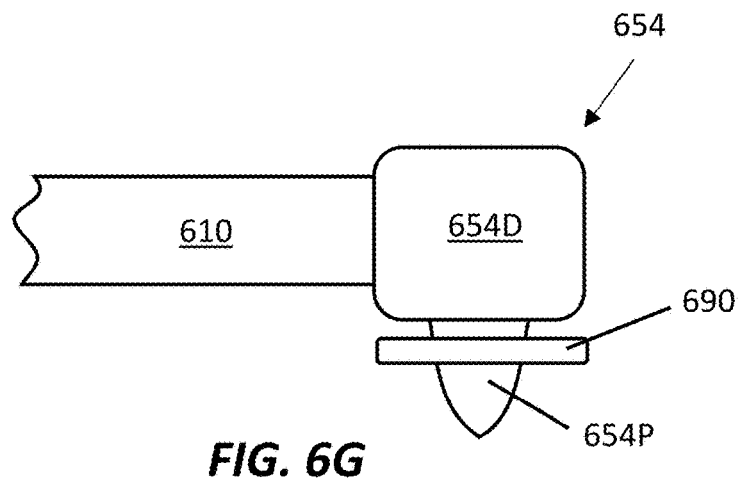

FIGS. 6E-6G show another implementation of an engagement portion 654 for engaging with the striker 690. The engagement portion 654 includes a proximal part 654P for coupling with the striker 690 and a distal part 654D that is connected to or integrated with the first member 610 (e.g., in a monolithic construction). In an example implementation, the proximal part 654P is located at the bottom of the distal part 654D and is positioned to be inserted into the striker 690 as shown in FIGS. 6E and 6F. In some cases, the engagement portion 654 may be monolithically attached to the first member 610 at the distal part 654D. Alternatively, in certain implementations, the engagement portion 654 may be designed to be connected to the first member 610 in a manner that permits it to be detached from the first member 610. This configuration enables the selection of an appropriate engagement portion for a specific striker. For example, in one implementation, the engagement portion 654 may include a coupling connection 6540, as shown in FIG. 6E, to which the first member 610 may be coupled. The coupling connection 6540 may be any suitable coupling for securing the first member 610 to the engagement portion 654. For instance, the coupling connection 6540 may be an opening (e.g., a threaded opening) to which the first member 610 may be attached via a threaded connection.

As shown in FIG. 6G, the distal part 654D is configured to be placed at the top of the striker 690, while the proximal part 654P is being inserted into the striker 690. When using a vehicle access device, a user applies a downward force onto the first member 610, and the striker 690 and a ground level provide a reaction force balancing the downward force.

Figure 6H:
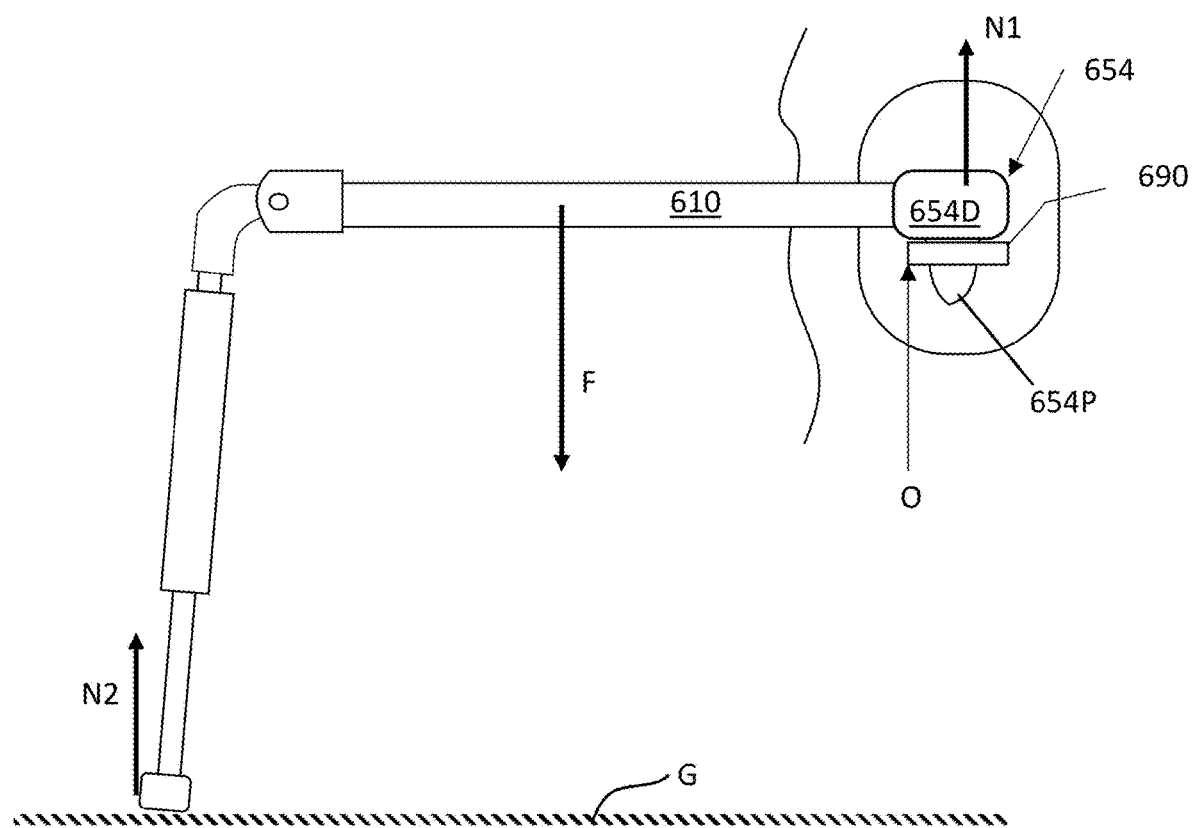
FIGS. 6H-6J are views of an engagement portion at various angular positions relative to a striker, according to an embodiment.

FIG. 6H shows an example deployed configuration of a vehicle access device in which the first member 610 is substantially parallel to the ground level G. In such a configuration, the proximal part 654P of the engagement portion 654 may be tightly inserted into an opening of the striker 690 preventing any substantial movement of the engagement portion 654 relative to the striker 690. As shown in FIG. 6H, the distal part 654D may be configured to rest securely over the top surface of striker 690. FIG. 6H shows that the downward force F exerted by a user onto the first member 610 is balanced by reaction forces N1 and N2 from the ground level G1 and from the striker 690 respectively.

Further, the clockwise torque created by reaction force N2 balances counterclockwise torques created by reaction force N1 and downward force F around a point of rotation O, as shown in FIG. 6H.

Figure 6I:
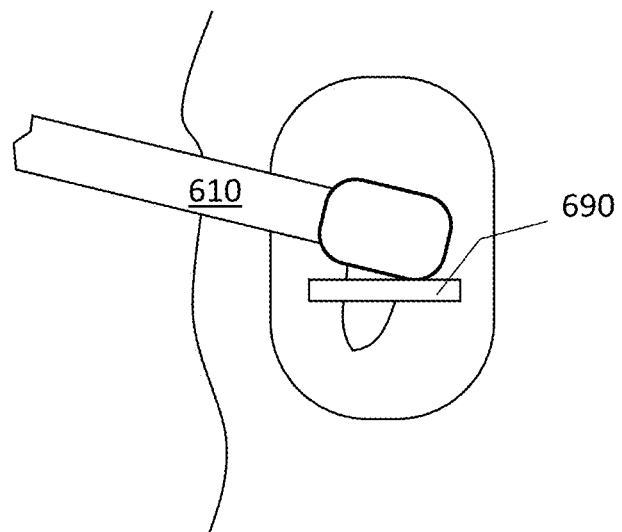
Figure 6J:
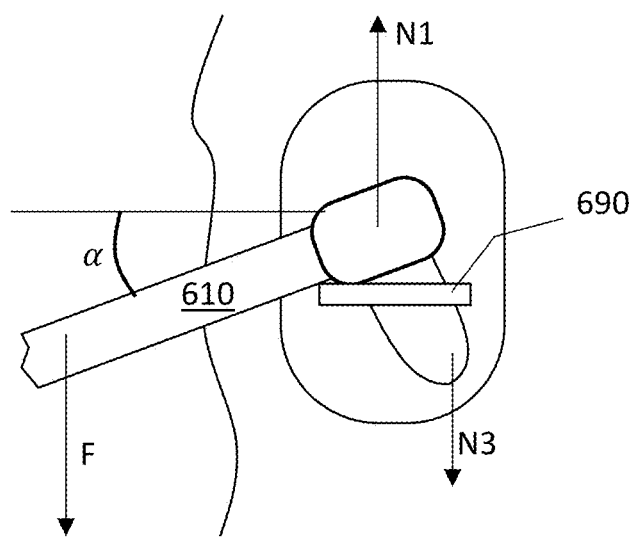

It should be noted that in some cases, the proximal part 654P may be designed to fit inside the opening of the striker with some room for movement. This allows for some positional and angular adjustment of the first member 610 relative to the striker 690. Such possibility of adjusting the engagement portion 654 may come at a cost of additional stresses onto the engagement portion 654. For example, FIGS. 6I and 6J demonstrate how the first member 610 can be adjusted relative to the striker 690. FIG. 6J shows that the proximal part 654P may have a size and shape to engage with the striker 690 such that the striker 690 may exert a reaction force N3 onto the proximal part 654P. The force N3 acts downwards, opposite to the reaction force N1 exerted on the distal part 654D. When the first member 610 is inclined at a predetermined angle α relative to the horizontal direction, the striker 690 exerts the reaction force N3 on the proximal part 654P. The presence of the reaction force N3 reduces the torques caused by reaction force N1 and a downward force F (as shown in FIG. 6J) exerted by the user on the first member 610. Note that without the reaction force N3, the torques from forces F and N1 are balanced by a torque due to the reaction force N2 from the ground level G (as shown in FIG. 6H) onto the vehicle access device at the point where it touches the ground level.

Figure 6K:
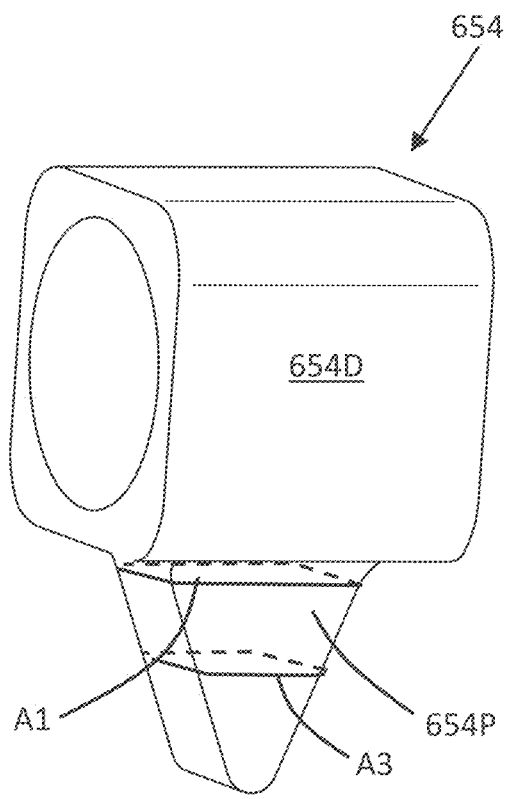
FIG. 6K is a perspective view of an engagement portion, according to an embodiment.
Figure 6L:
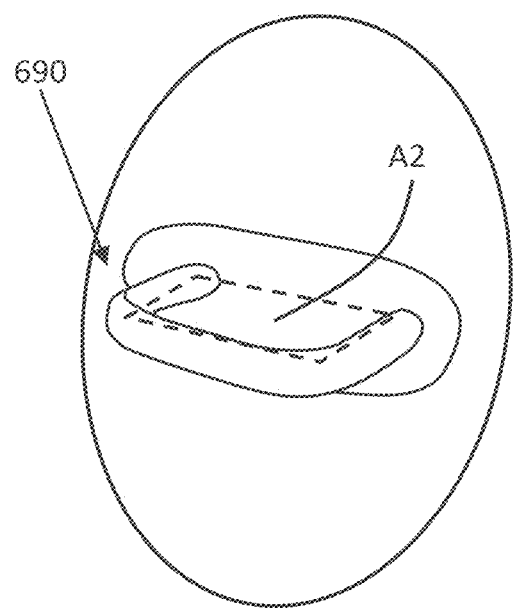
FIG. 6L is a perspective view of a striker, according to an embodiment.
Figure 6M:
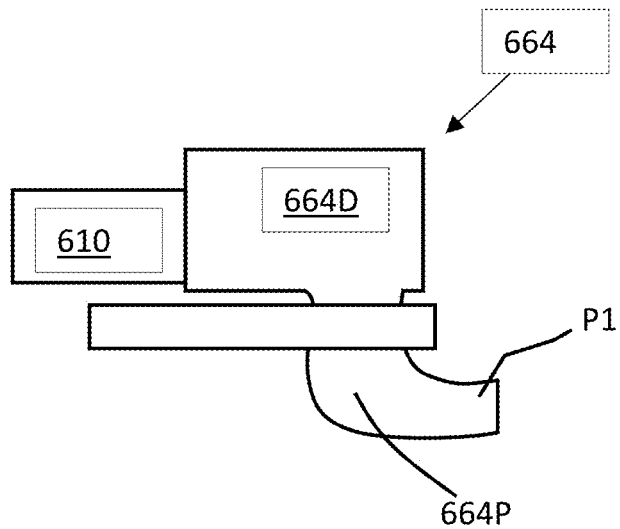
FIGS. 6M-6N are example implementations of an engagement portion including protrusions, according to embodiments.
Figure 6N:
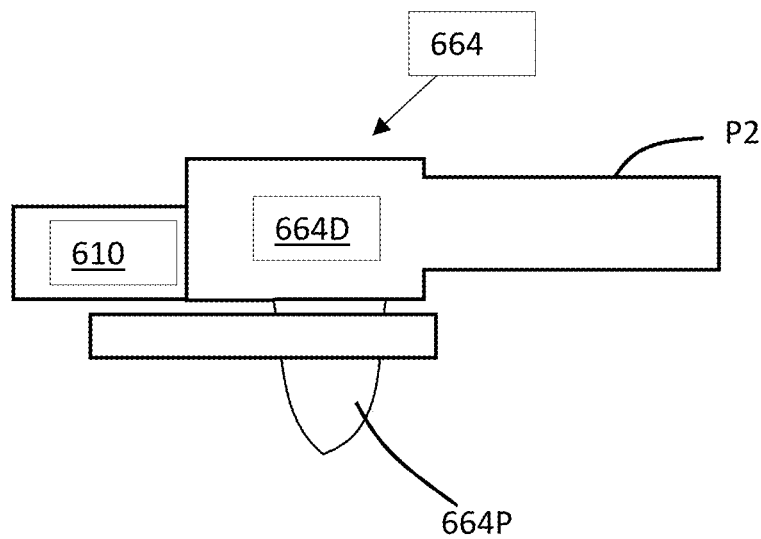

FIG. 6K shows a perspective view of the engagement portion 654, while FIG. 6L shows a perspective view of a section of the striker 690, having an opening with a cross-section A2. As shown in FIG. 6K, the proximal part 654P may be in a form of a substantially rectangular pyramid having an apex of the pyramid pointing away from the distal portion 654D and having a base of the pyramid adjacent to the distal portion 654D. In some cases, the base may have a cross-section A1 that has smaller area than area of the cross-section A2, further the cross-section A1 may be shaped such that when proximal part 654P is inserted into the opening of the striker 690, the distal portion 654D comes in a contact with a top surface of the striker 690 (e.g., the proximal portion 654P is being fully inserted into the opening of striker 690). In some cases, for cars with small striker cross-sections A2, the proximal portion 654P may not be fully inserted into the striker 690 opening and may be partially inserted (e.g., the proximal portion 654P may be inserted to the striker 690 up to a cross-section identified by A3 in FIG. 6K). It can be desirable to have the proximal portion 654P have a tapered structure such that the proximal portion 654P can fit into a variety of strikers (e.g., strikers have different sized openings). In use, the proximal portion 654P can be placed through the opening of the striker until it fits snugly within the opening such that the engagement portion 654 securely holds the vehicle access device relative to the striker and does not move while a user is applying forces on the vehicle access device. It should be noted that proximal part 654P in a form of an inverted rectangular pyramid is only one possible example and various other shapes and sizes for the proximal part may be used in some implementations. For example, the proximal part may be substantially a cone with a circular cross-section, may be a parallelepiped, or any other suitable shape allowing for the proximal part to be at least partially inserted into the striker 690. Additionally, the proximal part may include securing elements (e.g., movable clips, protrusions, etc. to further secure the engagement portion to the striker 690). For instance, FIG. 6M shows one possible engagement portion 664 having a proximal part 664P with a protrusion P1. Further, in some implementations, a distal portion 664D of the engagement portion 664 may have balancing extending elements/protrusions P2, as shown for example in FIG. 6N.

In certain instances, a proximal part of an engagement portion of the vehicle access device may be designed to be movable. To illustrate, it could be set up to move in and out of an aperture in a distal part of the engagement portion, thereby enabling the vehicle access device to function as a cane. In this scenario, the distal part would act as the handle for the cane, while the proximal part could retract into the opening of the distal part, resulting in a more comfortable grip without any protruding elements, such as the proximal part.

Figure 7A:
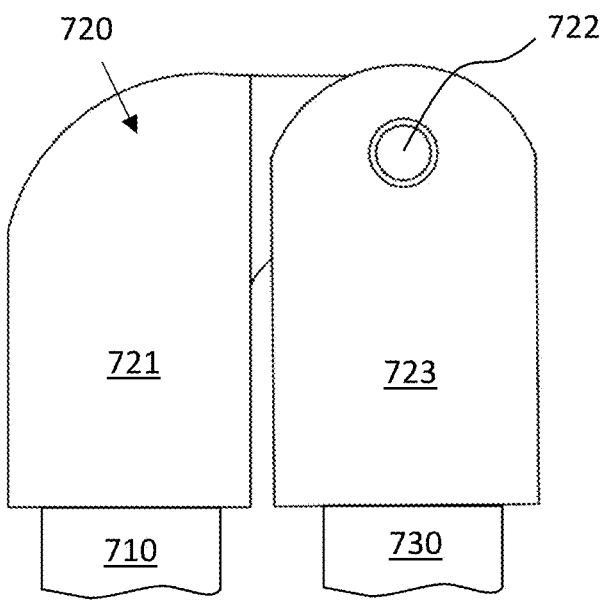
FIGS. 7A-7C are views of a central joint of a vehicle access device, according to an embodiment.
Figure 7B:
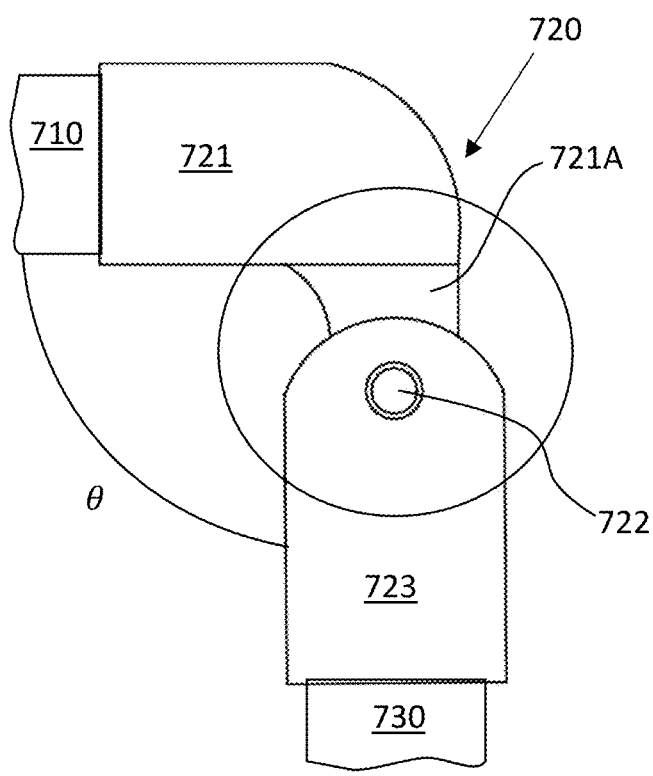
Figure 7C:
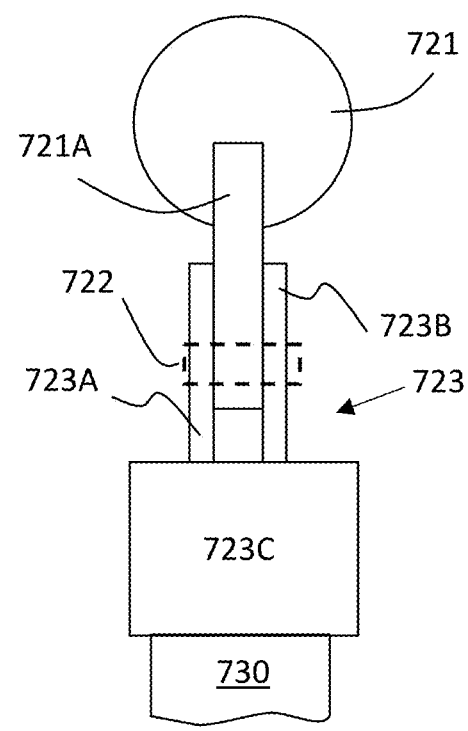

FIGS. 7A-7C show example configurations of a central joint 720 for pivotably connecting a first member 710 to a second member 730 of a device for providing mobility assistance, e.g., in getting in and out of a vehicle. FIG. 7A shows the central joint 720 in a folded configuration and FIGS. 7B and 7C shows the central joint 720 in a deployed configuration. FIG. 7B shows a side view of the central joint 720 in the deployed configuration and FIG. 7C shows a front view of the central joint 720 in the deployed configuration. The joint 720 may include a first central joint member 721 pivotably coupled to a second central joint member 723. The first central joint member 721 is configured to couple to the first member 710, while the second central joint member 723 is configured to couple to the second member 730. For instance, the first member 710 may be coupled to the first central joint member 721 at its distal end while the proximal end of the first member 710 is coupled to an engagement portion. Further, the proximal end of the second member 730 may be coupled to the second central joint member 723, while a distal end of the second member 730 may be coupled to a base.

In the folded configuration, the first central joint member 721 and the second central joint member 723 are positioned such that the first member 710 and the second member 730 are substantially parallel to each other (e.g., the central axis for these members are substantially parallel to each other). In the deployed configuration (or unfolded configuration), the first central joint member 721 and the second central joint member 723 are positioned such that the first member 710 and the second member 730 form a central joint angle θ between each other. In the example embodiment, as shown in FIG. 7B, the central joint angle θ is about 90 degrees, but it should be understood, as described above, that central joint angle θ may be smaller or larger than 90 degrees.

In an example implementation, the second central joint member 723 includes a pair of central joint shoulders 723A and 723B positioned as shown in FIG. 7C. The first central joint member 721 includes a central joint protruding member 721A for connecting to the central joint shoulders 723A and 723B via a pin 722. For example, the central joint protruding member 721A may include a first hole and central joint shoulders 723A and 723B may include respective second and third holes, such that, when the central joint protruding member 721A is placed between the central joint shoulders 723A and 723B and the first hole is aligned along the same axis with the second and third hole, the pin 722 may be inserted through the second, the first, and the third hole, thereby rotatably attaching the first central joint member 721 to the second central joint member 723.

In some implementations, as described above in relation to central joint locking, the central joint 720 includes a locking mechanism (not shown in FIGS. 7A-7C but described with respect to FIG. 8) for locking the first central joint member 721 in a fixed position relative to the second central joint member 723. Further, in some implementations, the central joint 720 may be coupled to a deployment mechanism (not shown in FIGS. 7A-7C but described with respect to FIG. 2A) for automatically pivoting the first central joint member 721 relative to the second central joint member 723.

Figure 8:
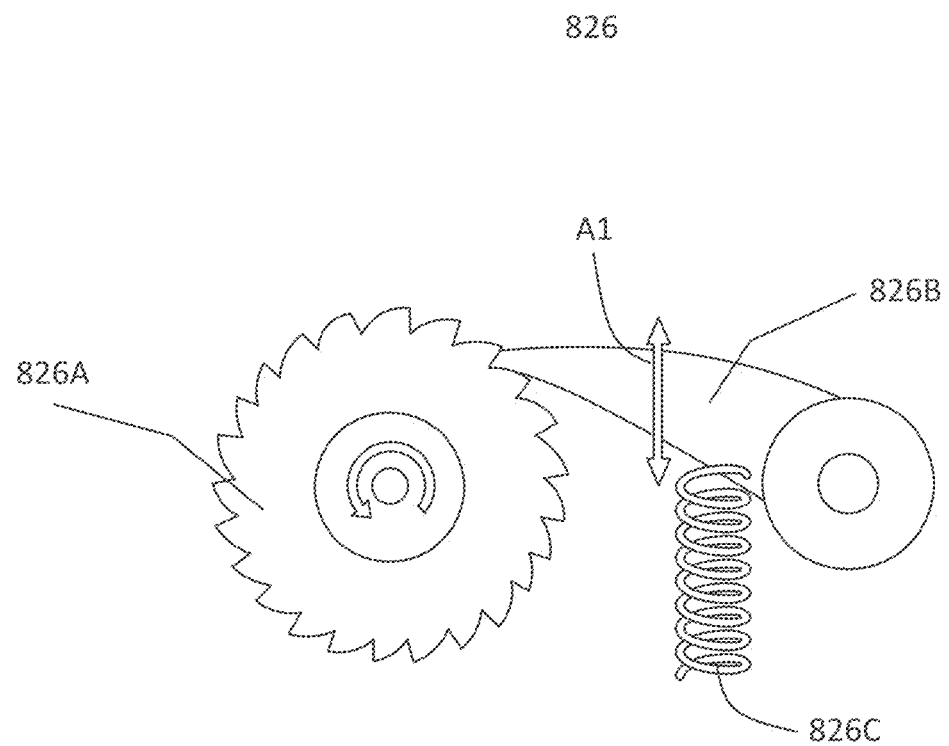
FIG. 8 is an example locking mechanism for locking the central joint angle of a vehicle access device, according to an embodiment.

An example rachet locking mechanism 826, shown in FIG. 8, may be used for central joint angle locking. For example, the rachet locking mechanism 826 includes a gear 826A that can be rotated in one direction (e.g., counterclockwise as shown in FIG. 8), but may not be rotated in the opposite direction when engaged to a pawl 826B. The pawl 826B may execute movements as shown by arrow A1 and may be connected to a spring 826C for facilitating coupling the pawl 826B to the gear 826A. When a device for assisting a user with a vehicle access including the rachet locking mechanism 826 is deployed, a first central joint member is rotated relative to a second central joint member by the central joint angle θ, and the gear 826A is rotated by the central joint angle θ and is locked at that angle. To unlock the selected central joint angle θ, a user may disengage the pawl 826B from the gear 826A via any suitable decoupling device (e.g., by a mechanical device which may be activated by a push of a button or any other suitable mechanical or electronic interfacing device). In an example embodiment, the pawl 826B may be configured to be disengaged until the user places the device in the folded configuration. After placing the device in the folded configuration, the pawl 826B may re-engage with the gear 826A, thereby reactivating the rachet locking mechanism.

Figure 9A:
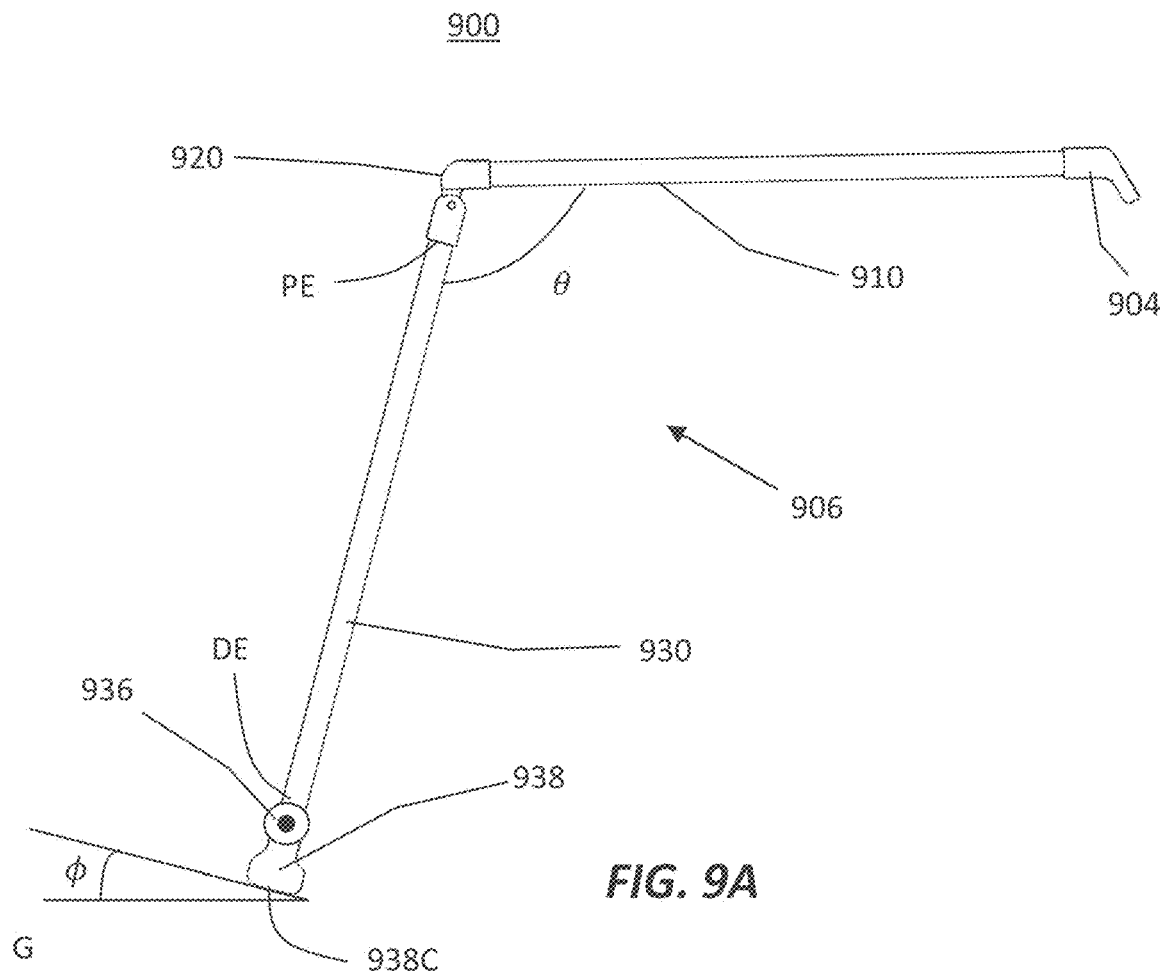
FIGS. 9A-9C are views of a base coupled to a member of a vehicle access device via a base joint, according to an embodiment.

As described above with respect to FIGS. 1A-3, in various embodiments, a device for assisting a user with vehicle access may include a base disposed on a distal end of a second member. For example, FIG. 9A shows a device 900 that includes an engagement portion 904 and an articulating leg 906. The articulating leg 906 includes a first member 910, a second member 930, a central joint 920, a base 938, and a base joint 936. In some cases, the device 900 may be similar to or the same as other devices described herein (e.g., devices 100, 200, 300, etc.). While implementations of device 900 is shown to have the base joint 936, in some other implementations, the base joint 936 may be absent, and the base 938 may be disposed directly at the distal end DE (as shown in FIG. 9A) of the second member 930. In such embodiments, the base 938 can be coupled to or integrated with the second member 930 (e.g., in a monolithic construction).

Figure 9B:
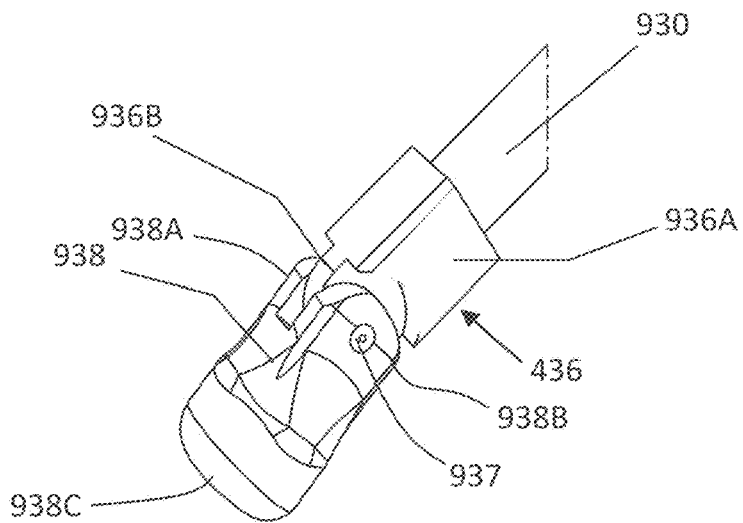

FIG. 9B shows a detailed view of the base joint 936. The base joint 936 may include a base joint proximal portion 936 that is coupled with a distal end of the second member 930 and a base joint protruding member 936B rotatably coupled to the base 938 via a pin 937. In the example implementation shown in FIG. 9B, the base includes shoulders 938A and 938B between which the base joint protruding member 938B is inserted and secured by the pin 937.

Figure 9C:
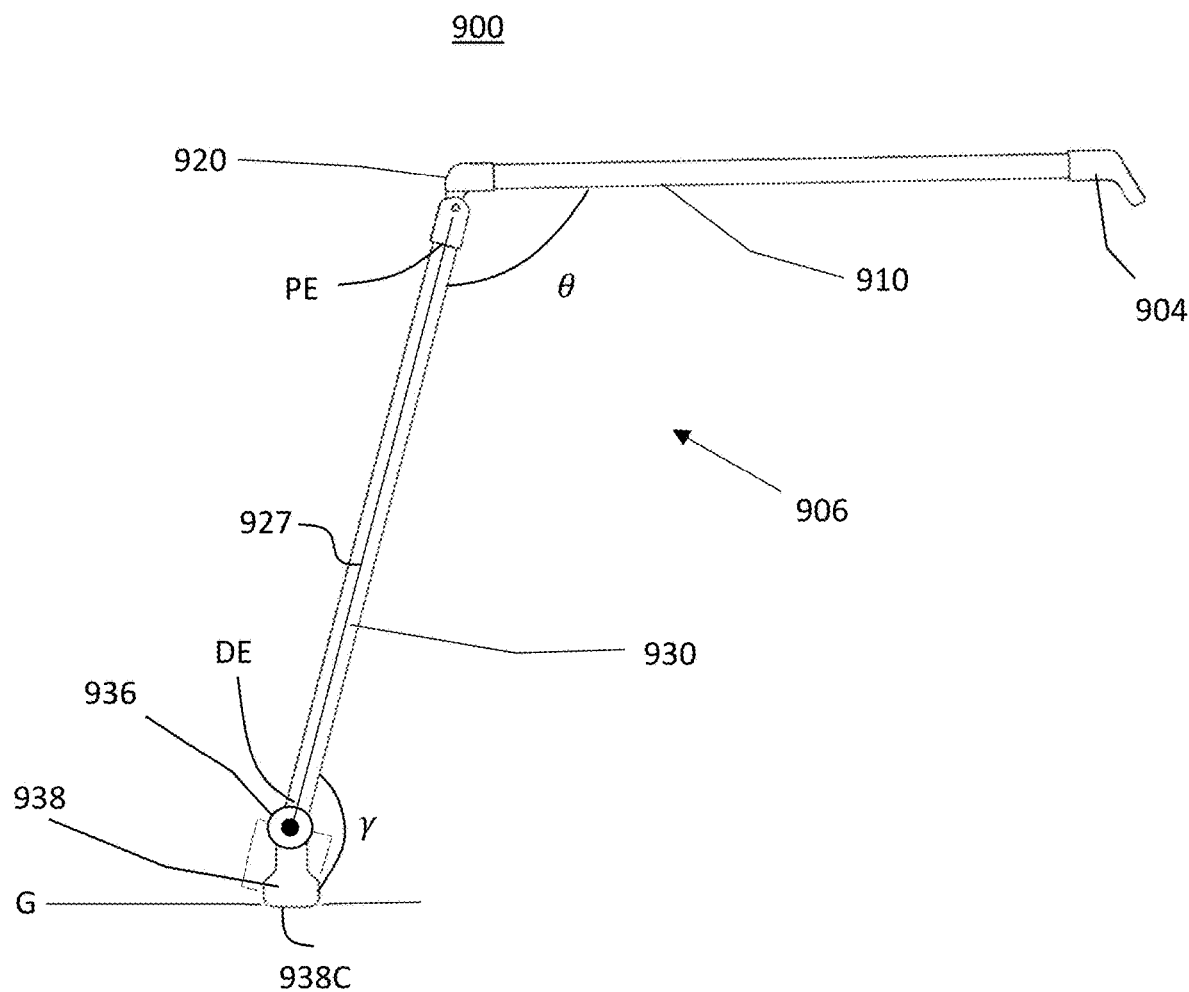

FIG. 9A shows the device 900 in a deployed configuration having a central joint angle θ, which results in a base bottom surface 938C forming an angle ϕ with the ground surface G. Such an angle ϕ may not provide sufficient traction or engagement between the base 938 and the ground surface G. In various embodiments, the base 938 may be rotated relative to the second member 930, as shown in FIG. 9C, such that the base bottom surface 938C is placed flat on the ground, thereby making a base angle γ with respect to the second member 930. In the example embodiment of the device 900, in the deployed configuration, a central joint angle θ between the first member 910 and the second member 930 is configured to be fixed by a user, and a second angle between the base 938 and the second member 930 (e.g., the base angle γ) is configured to be selected to place the base bottom surface 938C of the base substantially flat on the ground surface G. In some implementations, a connecting member 927 may be present and configured to adjust the base angle γ based on a selected value of the central angle θ. For instance, when the bottom surface 938C is placed flat on the ground surface G, as shown in FIG. 9C, the angle γ is related to angle θ (assuming that the first member 910 is substantially parallel to the ground surface G) as γ=270°−θ. In some implementations, the connecting member 927 is configured to automatically adjust the angle γ when the angle θ is selected. It should be noted, that in other implementations, the device 900 may not include the connecting member 927 and the angle γ may be manually adjusted by a user (e.g., by user pressing onto the device 900 when placing his/her weight onto the first member 910 of the device 900).

FIG. 9B shows the base joint having a single axis of rotation. In some other implementations a base may be coupled to a second member using a joint that can rotate about two or more axes of rotation such that a normal drawn to a base bottom surface of the base can be perpendicular to the ground surface G. This can allow for engagement between the base and the group even when the ground surface G is uneven. Such a joint may further improve traction of the base with the uneven ground surface G. In an example embodiment, the normal drawn to the base bottom surface may form a base angle with the axis of the second member. In some implementations, the base angle may be in a range of 0 to about 20 degrees, including all the values and sub-ranges in between.

It should be noted that bottom surface 938C may form an angle φ with the ground surface G and still provide sufficient traction with the ground surface G. Further, base 938 (e.g., a bottom of base 938 may be made from a flexible material (e.g., rubber, plastic, and the like) or material configured to have some adhesion to the ground surface G (e.g., material with a large friction coefficient with respect to the ground surface G). In some cases, the overall shape of the base 938 may be selected to better adhere to the ground surface G.

Figure 10A:
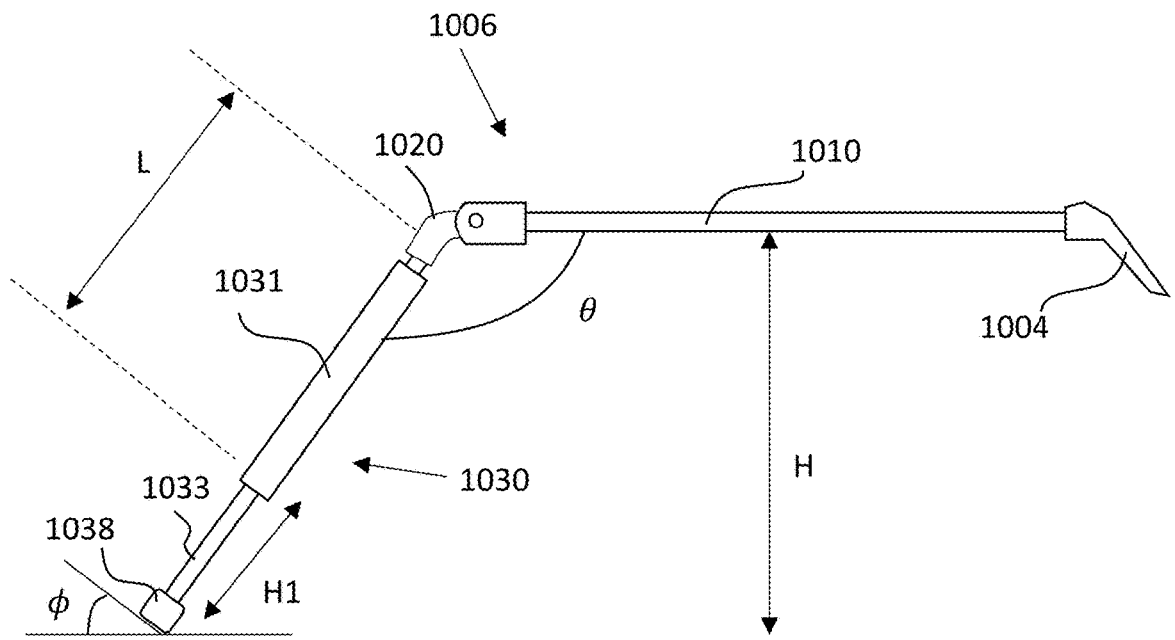
FIGS. 10A-10D show example deployed configurations of a vehicle access device, according to an embodiment.
Figure 10B:
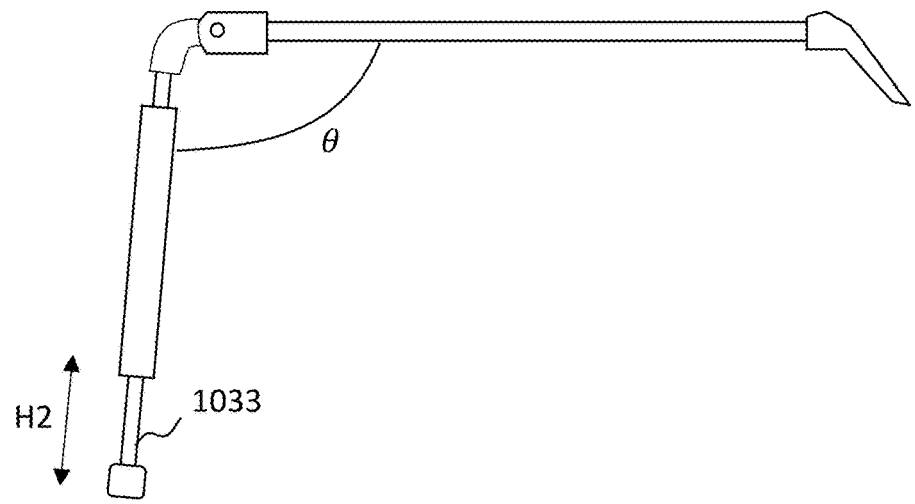

FIGS. 10A-10D show various deployed configurations of an example device 1000 for providing mobility assistance, e.g., in getting in and out of a vehicle, according to embodiments. The device 1000 can be structurally and/or functionally similar to other devices described herein (e.g., devices 100, 200, 300, etc.). For example, FIG. 10A shows the device 1000 in the deployed configuration having an engaging portion 1004 and an articulating leg 1006. The articulating leg 1006 includes a first member 1010, a second member 1030, a central joint 1020, and a base 1038. The second member 1030 includes a first elongated portion 1031 and a second elongated portion 1033. In the example embodiment, the second elongated portion 1033 is configured to extend out from the first elongated portion 1031 or retract into the first elongated portion (e.g., as show in FIG. 10A, the second elongated portion 1033 is extended out from the first elongated portion 1031 by an amount of $H_1$). In an example configuration shown in FIG. 10A, a central joint angle θ may be selected to be larger than 90 degrees resulting in the base 1038 making an angle φ with the ground surface G. It should be appreciated that a height H of a striker above the ground surface G, the extended amount $H_1$, and a length L of the first elongated portion are related to a central joint angle θ as: θ=acos(H/($H_1$+L))+90°. For example, when $H_1$+L~H, then θ~90°, and when $H_1$+L~2H, then θ~150°. For instance, FIG. 10B shows $H_2$+L~H and θ~90° (herein, $H_2$ is an extended amount of the second elongated portion 1033, as shown in FIG. 10B).

Figure 10C:
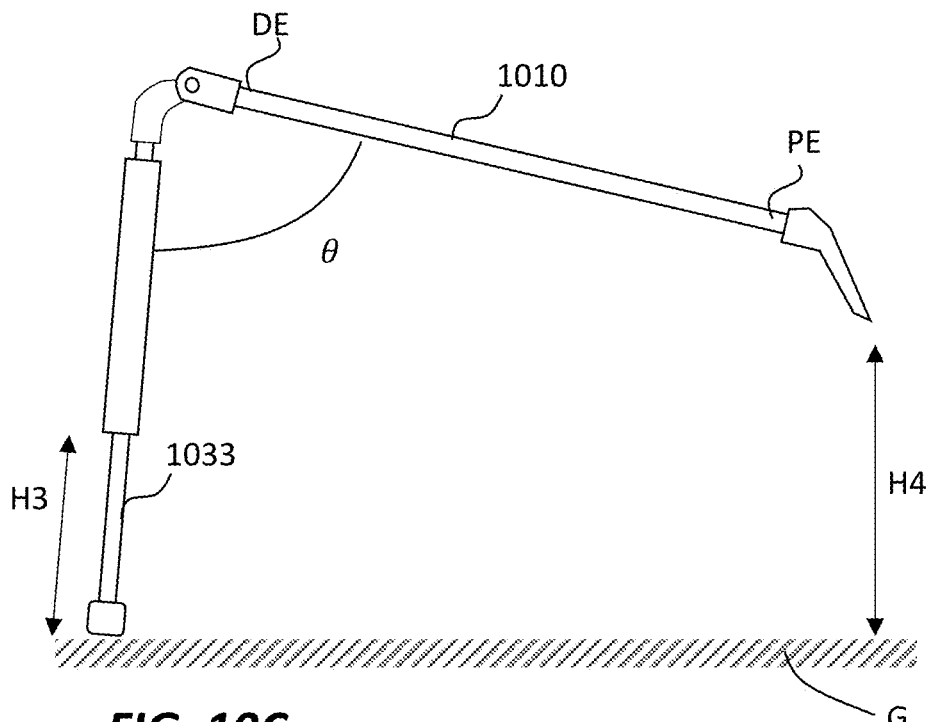
Figure 10D:
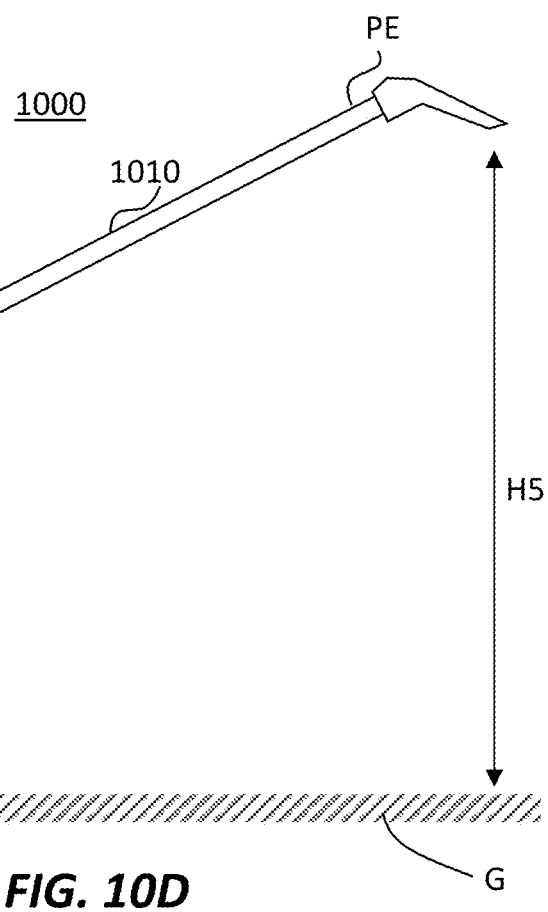

FIG. 10C shows another deployed configuration of the device 1000 in which the first member 1010 is not parallel to the ground surface G (e.g., a distal end DE of the first member 1010 is located higher than a proximal end PE of the first member 1010). In the configuration shown FIG. 10C, the central joint angle θ is less than 90 degrees and $H_3$+L>H (herein, $H_3$ is an extended amount of the second elongated portion 1033, as shown in FIG. 10C). FIG. 10D shows another deployed configuration of the device 1000 in which the first member 1010 is not parallel to the ground surface G (e.g., a distal end DE of the first member 1010 is located lower than a proximal end PE of the first member 1010, as shown in FIG. 10D). In the configuration shown FIG. 10D, the central joint angle θ is greater than 90 degrees and $H_4$+L<H (herein, $H_4$ is an extended amount of the second elongated portion 1033, as shown in FIG. 10D). Configurations shown in FIGS. 10C and 10D may be useful for stability of the device 1000 depending on the height of a car's door striker or a condition (e.g., flatness) of the ground level G. For instance, the configuration of device 1000, as shown in FIG. 10C may be used when the door striker is located relatively close ground level G (e.g., a distance H4 from the ground level G), while the configuration of device 1000 as shown in FIG. 10D is located further away from ground level G (e.g., a distance H5 from the ground level G).

Figure 11A:
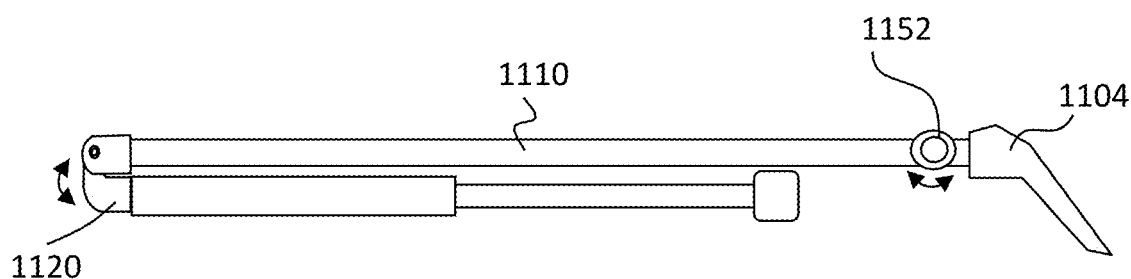
FIGS. 11A and 11B are views of a vehicle access device having an engagement joint, according to an embodiment.
Figure 11B:
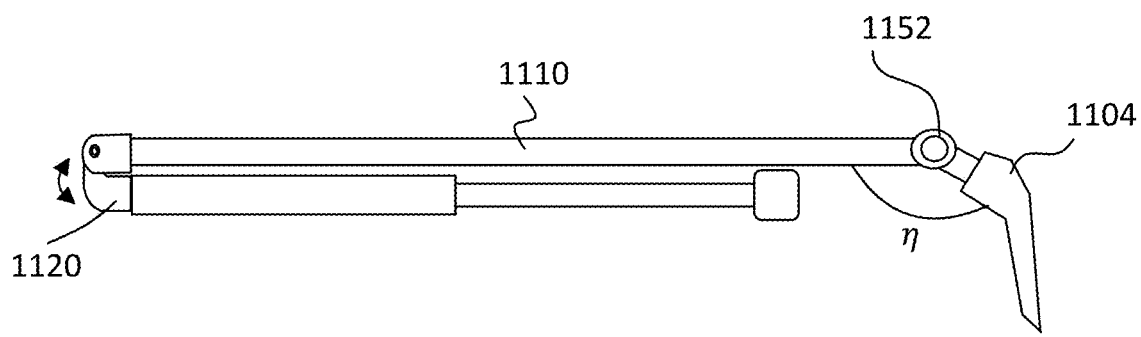

FIG. 11A shows an example embodiment of a device 1100 for providing mobility assistance, e.g., in getting in and out of a vehicle, in a folded configuration. The device 1100 may be similar to various embodiments of the previously discussed devices herein (e.g., devices 100, 200, 300, etc.) with an addition of an engagement joint 1152. The engagement joint 1152 may be configured to couple a first member 1110 of the device 1100 to the engagement portion 1104. In some cases, the engagement joint 1152 may be similar to a central joint (e.g., a central joint 1120, as shown in FIG. 11). For example, the engagement joint 1152 may be configured such that the engagement joint 1104 may be rotated relative to the first member 1110. For instance, as shown in FIG. 11B, the engagement joint 1104 is rotated relative to the first member 1110 by a user-selected engagement joint angle η. In some cases, once selected by the user, the engagement joint angle 77 may remain fixed (e.g., using a rachet mechanism similar to the rachet mechanism 826, as shown in FIG. 8, or using any other suitable locking mechanism, such as a locking pin, a clamp, a clip, and the like) until it is further adjusted by the user.

Figure 12A:
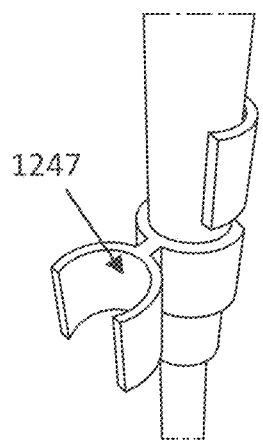
FIGS. 12A and 12B are views of a vehicle access device having a securing clip, according to an embodiment.
Figure 12B:
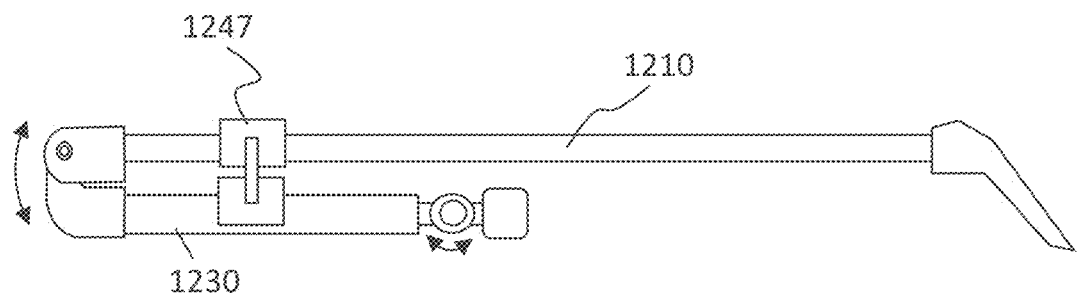

FIGS. 12A and 12B show an example device 1200 for providing mobility assistance, e.g., in getting in and out of a vehicle, according to embodiments. The device 1200 may be similar to embodiments of other devices disclosed herein (e.g., devices 100, 200, 300, etc.). The device 1200 may include a securing clip 1247 for securing a first member 1210 to the second member 1230 when the device 1200 is in the folded configuration. The securing clip 1247 is configured to maintain the first member 1210 parallel to the second member 1230 until a sufficient force is applied to separate the first member 1210 from the second member 1230 when deploying the device 1200.

Figure 13:
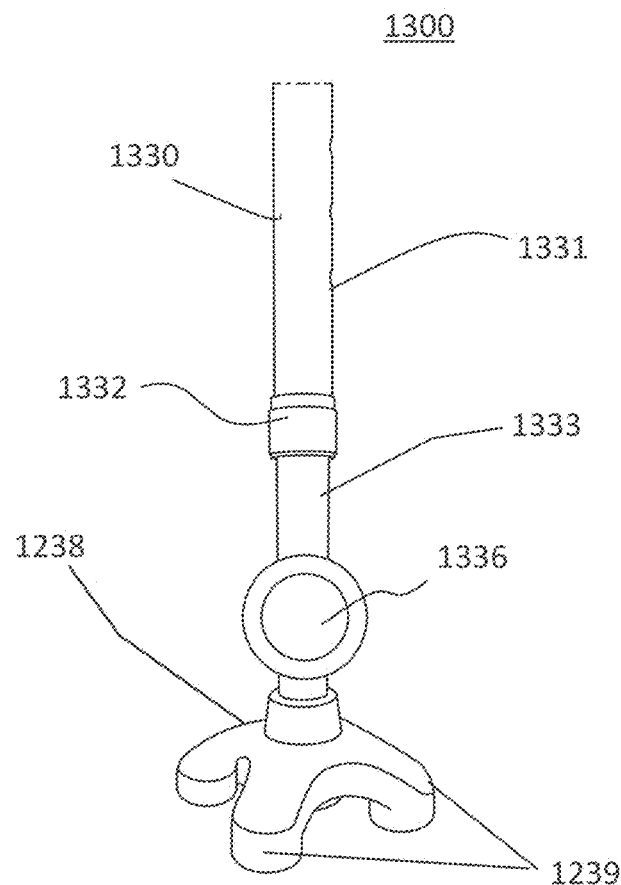
FIG. 13 is an example of a vehicle access device having a base with multiple legs, according to an embodiment.
Figure 14:
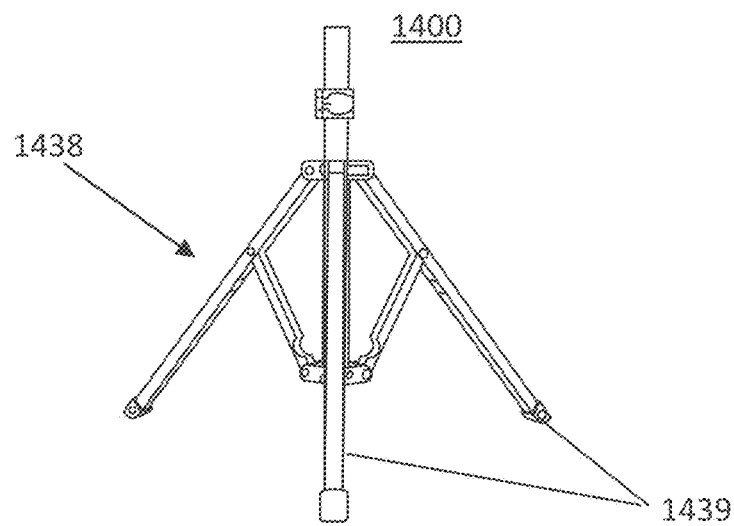
FIG. 14 is another example of a vehicle access device having a base with multiple legs, according to an embodiment.
Figure 15:
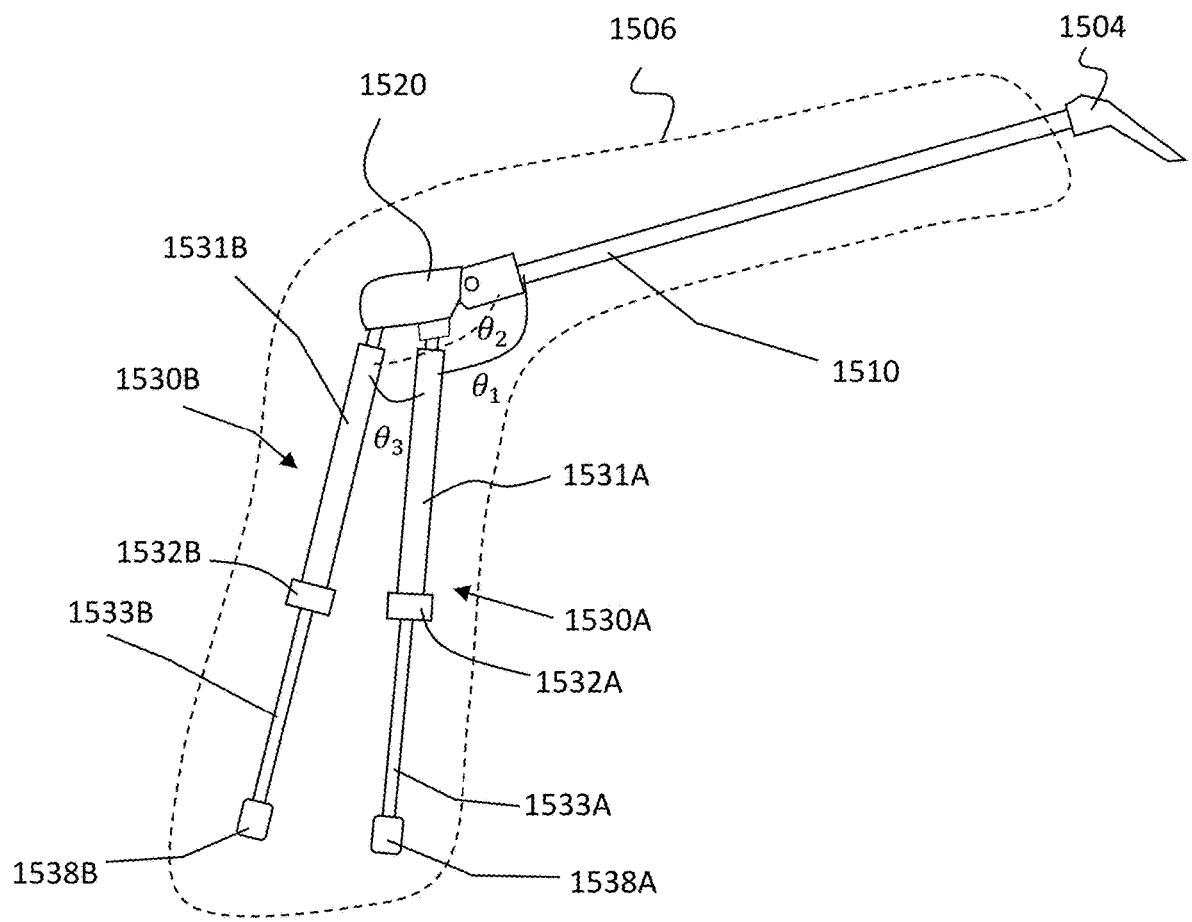
FIG. 15 is an example of a vehicle access device having two members, according to an embodiment.

FIGS. 13-15 show example embodiments of respective devices 1300-1500 with different bases, which can provide certain advantages (e.g., improved stability, greater grip/engagement, etc.). Devices 1300-1500 can be structurally and/or functionally similar to other devices described herein (e.g., devices, 100, 200, 300, etc.). For example, FIG. 13 shows the device 1300 that includes a second member 1330 and a base 1338. In the example embodiment, the second member 1330 includes a first elongated portion 1331, a second elongated portion 1333 that can be inserted into the first elongated portion 1331, and a locking mechanism 1332 for locking the second elongated portion 1333 relative to the first elongated portion 1331 when the second elongated portion 1333 is extended from the first elongated portion 1331 by a set distance. In the example implementation, the locking mechanism 1332 is a twist lock, but as described above, other locking mechanisms can also be used. FIG. 13 shows that the base 1338 includes multiple legs 1339, which can be configured to improve support for the device 1300.

FIG. 14 shows another example embodiment of a device 1400 that includes a base 1438. The base 1438 may include multiple (three, as shown in FIG. 14) foldable legs 1439. In an example implementation, the foldable legs 1439 may be configured to be deployed (e.g., unfolded as show in FIG. 14), when the device 1400 is in a deployed configuration. Further, when the device is in a folded configuration, the foldable legs 1439 may be configured to fold, thereby reducing a profile or a space occupied by the device 1400.

FIG. 15 shows another embodiment of a device 1500 which includes an engaging portion 1504 and an articulating leg 1506. The articulating leg includes a first member 1510 and two second members, a right second member 1530A and a left second member 1530B. In one implementation, the right second member 1530A and the left second member 1530B may include identical elements. For example, the right second member 1530A may include a right first elongated portion 1531A, a right second elongated portion 1533A, a right locking mechanism 1532A, and a right base 1538A. These elements may be similar or the same as corresponding elements of other devices described herein. Similarly, the left second member 1530B may include a left first elongated portion 1531B, a left second elongated portion 1533B, a left locking mechanism 1532B, and a left base 1538B. These elements also may be similar or the same as corresponding elements of other devices described herein. Further, the device 1500 includes a central joint 1520 configured to position the left second member 1530A and the right second member 1530B such that they form angles: $\theta_1$—an angle between the right second member 1530A and the first member 1510, $\theta_2$—an angle between the left second member 1530B and the first member 1510, and $\theta_3$—an angle between the right second member 1530A and the left second member 1530B, as shown in FIG. 15. Having two second members 1530A and 1530B may improve the stability of the device 1500. Further, in some implementations when placing the device 1500 in a deployed configuration (e.g., by activating a deploying mechanism as described above), the right second member 1530A and the left second member 1530B may be positioned such that angles $\theta_1$, $\theta_2$, and $\theta_3$ are selected automatically. In some cases, the device 1500 may include a suitable mechanical or electrical interface, such that a user may adjust the angles $\theta_1$, $\theta_2$, and $\theta_3$ prior to using the device 1500. In some cases, the interface may allow a user to adjust one or two of the three angles $\theta_1$, $\theta_2$, and $\theta_3$, while remaining angles are adjusted automatically by one or more suitable adjusting mechanisms associated with the device 1500.

Consistent with disclosed embodiments, a kit is also provided. The kit may be used to assemble a device for assisting a user in getting into and out of a vehicle. In an example embodiment, a kit may include various assembled or disassembled parts. For example, the kit may include an engagement portion configured to engage a striker in a doorframe of a vehicle and to hold the device in a fixed relationship relative to the striker. The engagement portion may be similar to or the same as the engagement portion 104 of the device 100, as shown in FIG. 1A. The kit may further include a first member of an articulating leg having a first end (herein, also referred to as a proximal end of the first member) and a second end (herein also referred to as a distal end of the first member), the first end configured to be coupled to the engagement portion. The first member may be similar to or the same as the first member 110 of the device 100. Further, the kit may include a second member of the articulating leg having a first end (herein, also referred to as a proximal end of the second member) and a second end (herein, also referred to as a distal end of the second member). The second member may be similar to or the same as the second member 130 of the device 100. Additionally, the kit may include a joint configured to pivotably connect the first member and the second member by coupling to a second end of the first member and to the first end of the second member (e.g., the joint may be referred to as a central joint and may be similar to or the same as the central joint 120 of the device 100). Additionally, the kit may include a base configured to couple to the second end of the second member (e.g., the base may be similar to or the same as the base 338, of the device 300, as shown in FIG. 3). In one embodiment, the second member of the kit may include a first elongated portion slidably connected to a second elongated portion, wherein the first elongated portion may be locked into place with respect to the second elongated portion using a second member locking mechanism so as to adjust a length of the second member. For example, the first elongated portion of the kit may be similar to or the same as the first elongated portion 531 of the second member 530, and the second elongated portion may be similar to or the same as the second elongated portion 532. Further, the second member locking mechanism may be similar to or the same as the second member locking mechanism 532. In some cases, the kit may include more than one first member, more than one second member, more than one engagement portion, more than one joint, and/or more than one base, e.g., to allow a user to selectively choose which type of member, joint, base, etc. to use, depending on need (e.g., weather conditions, ground surface angle, height of vehicle, etc.). Further, in some implementations the kit may include a base joint for coupling the base to the second end of the second member.

In some cases, various parts of the kit may be disconnected, and may be coupled to each other based on a particular need of the user. For example, if the kit contains more than one engagement portions, a particular engagement portion may be selected for assembling the device based on a type of a striker of a car for which the device is going to be used. In some cases, the kit may contain several engagement portions and/or several bases. For example, the kit may include a first base and a second base. In some case, each of the first and second bases may be configured to selectively couple to the second end of the second member. In some cases, the kit may include several types of second members. For instance, the kit may include a first type of the second member, being an extended cylindrical object, such as pipe, having a first end for coupling with the central joint and a second end for coupling with the base, and a second type of the second member which may be assembled by coupling a first elongated portion and a second elongated portion. Further, the kit may include one or more joints for coupling different parts of the device. For instance, the kit may include one or more central joints, and/or one or more base joints and/or one or more engagement joints.

Consistent with disclosed embodiments, various methods of using a device such as any one of the vehicle access devices described herein (e.g., the device 100, 200, 300, etc.) is also provided. An example method 1600 is shown in FIG. 16 and describes placing a device, such as the device 300, into a deployed configuration. The method includes engaging an engagement portion of a vehicle access device to a striker located in a doorframe of a vehicle, e.g., by placing a top surface of the engagement portion under and adjacent to a back portion of the striker element and placing a bottom surface of the engagement portion over and adjacent to the front portion of the striker element, at 1610. Further, the method includes, at 1620, unfolding an articulating leg coupled to the engagement portion by forming a selected angle between a first member and a second member of the articulating leg such that the selected angle is larger than 90 degrees, the first member being pivotably connected to the second member. Additionally, the method 1600 includes, at 1630, locking the first member in a fixed position relative to the second member. The method 1600 includes, at 1640, placing a base coupled to a distal end of the second member onto a ground surface.

In some cases, when the second member includes a first elongated portion slidably connected to a second elongated portion, the method further includes optional 1631 of extending the first elongated portion relative to the second elongated portion by a selected distance. Additionally, the method includes, at 1632, optionally locking the first elongated portion into place with respect to the second elongated portion.

An example method 1700 is shown in FIG. 17 and describes placing a vehicle access device, such as device 300, into a folded configuration. The method 1700 includes disengaging an engagement portion of the device from a striker located in a doorframe of a vehicle, at 1710, and unlocking a first member of an articulating leg from being in a fixed position relative to a second member of the articulating leg, at 1720. The unlocking may include removing a central joint angle locking by a user actuating an unlocking mechanism. In some cases, the unlocking mechanism includes a button. At 1730, the method 1700 includes folding the articulating leg by pivoting the first member relative to the second member such that the first member is substantially parallel to the second member.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A device, comprising:
   a rigid member configured to engage a striker in a doorframe of a vehicle and to hold the device in a fixed relationship relative to the striker;
   an articulating leg coupled to the rigid member, the articulating leg including a first member pivotably connected to a second member, wherein the articulating leg is configured to be transitioned between a folded configuration in which the first member is disposed substantially parallel to the second member and a deployed configuration in which the first member is angled relative to the second member; and
   a lock configured to lock the articulating leg in the folded configuration.

2. The device of claim 1, further comprising a central joint connecting the first member and the second member.

3. The device of claim 2, wherein the central joint includes a rachet configured to allow the second member to rotate relative to the first member in one direction while preventing the second member from rotating relative to the first member in an opposite direction.

4. The device of claim 3, wherein the ratchet includes a pawl and a wheel, and the pawl is configured to engage or disengage with the wheel to control the rotation of the wheel.

5. The device of claim 1, further comprising a base disposed on the distal end of the second member.

6. The device of claim 1, further comprising a deployment mechanism configured to automatically pivot the first member and the second member into a deployed position.

7. The device of claim 6, wherein the deployment mechanism comprises:
   a spring-based mechanism configured to rotate the second member relative to the first member when the device is in a folded configuration; and
   a button, configured to activate the spring-based mechanism to transition the device from the folded configuration to a deployed configuration upon user pressing the button.

8. The device of claim 1, wherein the rigid member incudes a top surface and a bottom surface, and wherein the rigid member is configured to be inserted into the striker, the striker having a striker front portion and a striker back portion such that the top surface of the rigid member is placed under and adjacent to the striker back portion and the bottom surface of the rigid member is placed over and adjacent to the striker front portion.

9. The device of claim 1, wherein the device is configured to be placed in a folded configuration and a deployed configuration, and the first member is positioned substantially parallel to the second member when the device is placed in the folded configuration.

10. The device of claim 9, wherein in the deployed configuration an angle formed between the first member and the second member is larger than 90 degrees.

11. The device of claim 10, wherein in the deployed configuration the first member is configured to be placed substantially parallel to a ground surface.

12. The device of claim 9, further comprising a base disposed on the distal end of the second member, and wherein the base is connected with the second member via a base joint configured to rotate the base relative to the central joint.

13. The device of claim 12, wherein in the deployed configuration a first angle between the first member and the second member is configured to be fixed, and wherein a second angle between the base and the second member is configured to be selected to place a bottom surface of the base substantially flat on a ground.

14. The device of claim 13, further comprising a connecting member configured to adjust the second angle based on a selected value for the first angle.

15. The device of claim 1, further comprising an anti-slip rubber base disposed on the distal end of the second member.

16. The device of claim 15, wherein the anti-slip rubber base is configured to pivot by a pivoting angle about any one of two axes of rotation oriented perpendicularly to an axis of the second member.

17. The device of claim 16, wherein the pivoting angle less than about 20 degrees.

18. The device of claim 1, wherein the second member includes a first elongated portion slidably connected to a second elongated portion, wherein the first elongated portion is configured to be allowed to be locked into place with respect to the second elongated portion so as to adjust a length of the second member.

19. The device of claim 18, wherein a first length of the first elongated portion and a second length of the second elongated portion is selected such that a combined length of the first length and the second length is about or larger than a distance between the location of the striker and a ground surface.

20. The device of claim 19, wherein the first length of the first elongated portion is about equal to or greater than the second length.

21. The device of claim 20, wherein the first length is less than a length of the first member.

22. A kit, comprising:
   a rigid member configured to engage a striker in a doorframe of a vehicle and to hold the device in a fixed relationship relative to the striker;
   a first member of an articulating leg having a first end and a second end, the first end configured to be coupled to the rigid member;

a second member of the articulating leg having a first end and a second end;

a central joint configured to pivotably connect the first member and the second member by coupling to a second end of the first member and to the first end of the second member such that the first member and the second member are transitionable between a folded configuration in which the first member is disposed substantially parallel to the second member and a deployed configuration in which the first member is angled relative to the second member;

a base configured to couple to the second end of the second member; and a lock configured to lock the first member and the second member in the folded configuration.

23. The kit of claim 22, wherein the second member further includes a first elongated portion slidably connected to a second elongated portion, wherein the first elongated portion may be locked into place with respect to the second elongated portion so as to adjust a length of the second member.

24. The kit of claim 22, wherein the base is a first base, the kit further comprising a second base different from the first base, each of the first and second bases configured to selectively couple to the second end of the second member.

25. A method, comprising:

engaging a rigid member of a vehicle access device to a striker located in a doorframe of a vehicle by:
  placing a top surface of the rigid member under and adjacent to a back portion of the striker element, and
  placing a bottom surface of the rigid member over and adjacent to the front portion of the striker element; and unlocking a lock of the vehicle access device, the lock configured to lock an articulating leg of the vehicle access device in a folded configuration in which a first member of the articulating leg is disposed substantially parallel to a second member of the articulating leg, the articulating leg being coupled to the rigid member;

unfolding, after unlocking the lock, the articulating leg by forming a selected angle between the first member and the second member of the articulating leg such that the selected angle is larger than 90 degrees, the first member being pivotably connected to the second member; and locking, after unfolding the articulating leg, the first member in a fixed position relative to the second member such that the selected angle between the first member and the second member of the articulating leg is maintained.

26. The method of claim 25, further comprising placing a base coupled to a distal end of the second member onto a ground surface.

27. The method of claim 25, wherein the second member includes a first elongated portion slidably connected to a second elongated portion, the method further comprising:
  extending the first elongated portion relative to the second elongated portion by a selected distance;
  locking the first elongated portion into place with respect to the second elongated portion; and
  placing a base coupled to a distal end of the second elongated portion onto a ground surface.

28. The method of claim 25, wherein the locking the first member in the fixed position relative to the second member occurs automatically in response to the selected angle being formed between the first member and the second member.

29. A method, comprising:

disengaging a rigid member of a vehicle access device from a striker in a doorframe of a vehicle, the rigid member when engaged with the striker configured to hold the vehicle access device in a fixed relationship relative to the striker;

unlocking a first member of an articulating leg from being in a fixed position relative to a second member of the articulating leg, the first member being pivotably connected to the second member;

folding the articulating leg to a folded configuration by pivoting the first member relative to the second member such that the first member is substantially parallel to the second member; and locking the articulating leg in the folded configuration.

30. The method of claim 29, wherein the unlocking the first member from the fixed position relative to the second member is performed by a user actuating an unlocking mechanism.

31. The method of claim 30, wherein the unlocking mechanism is a button.

* * * * *